(12) United States Patent
Imeson et al.

(10) Patent No.: US 12,424,807 B2
(45) Date of Patent: Sep. 23, 2025

(54) METHOD OF MANUFACTURING A WINDOW ASSEMBLY WITH A SOLDERLESS ELECTRICAL CONNECTOR

(71) Applicant: AGC Automotive Americas Co., Alpharetta, GA (US)

(72) Inventors: Christopher A. Imeson, Lasalle (CA); Joel Smith, Battle Creek, MI (US); Marina Lynn Gearhart, Redford, MI (US); Jiangping Wang, Novi, MI (US); Timothy D. Peck, White Lake, MI (US)

(73) Assignee: AGC Automotive Americas Co., Alpharetta, GA (US)

( * ) Notice: Subject to any disclaimer, the term of this patent is extended or adjusted under 35 U.S.C. 154(b) by 410 days.

(21) Appl. No.: 17/860,296

(22) Filed: Jul. 8, 2022

(65) Prior Publication Data

US 2024/0014617 A1 Jan. 11, 2024

(51) Int. Cl.
*H01R 43/027* (2006.01)
*B32B 17/10* (2006.01)
(Continued)

(52) U.S. Cl.
CPC ..... *H01R 43/027* (2013.01); *B32B 17/10385* (2013.01); *B32B 17/10761* (2013.01);
(Continued)

(58) Field of Classification Search
None
See application file for complete search history.

(56) References Cited

U.S. PATENT DOCUMENTS

| 4,668,270 A | 5/1987 | Ramus |
| 4,744,844 A | 5/1988 | Hurst |

(Continued)

FOREIGN PATENT DOCUMENTS

| CN | 106335291 A | 1/2017 |
| CN | 114765970 A | 7/2022 |

(Continued)

OTHER PUBLICATIONS

English language abstract and machine-assisted English translation for JP 2002-353622 A extracted from espacenet.com database on Nov. 25, 2024, 27 pages.

(Continued)

*Primary Examiner* — Abbas Rashid
*Assistant Examiner* — Adrianna N Konves
(74) *Attorney, Agent, or Firm* — Howard & Howard Attorneys PLLC

(57) ABSTRACT

A method of manufacturing a window assembly having a solderless electrical connector includes forming a curved transparent substrate and applying a conductive ink having a thermal degradation temperature onto a surface of the curved transparent substrate. The method further includes applying an adhesive onto the surface of the curved transparent substrate adjacent to the conductive ink and optionally onto the applied conductive ink, and curing the adhesive at a temperature below the thermal degradation temperature of the conductive ink to form the solderless electrical connector with the solderless electrical connector being in electrical contact with the applied conductive ink.

13 Claims, 13 Drawing Sheets

(51) Int. Cl.
  *B32B 37/12* (2006.01)
  *B32B 38/00* (2006.01)
  *C03C 27/10* (2006.01)
  *H01R 4/04* (2006.01)

(52) U.S. Cl.
  CPC ........ *B32B 37/1207* (2013.01); *B32B 38/145* (2013.01); *C03C 27/10* (2013.01); *H01R 4/04* (2013.01); *B32B 2037/1253* (2013.01); *B32B 2307/202* (2013.01); *B32B 2315/08* (2013.01); *B32B 2605/006* (2013.01); *H01R 2201/26* (2013.01)

(56) References Cited

U.S. PATENT DOCUMENTS

| | | | |
|---|---|---|---|
| 4,786,784 A | 11/1988 | Nikodem et al. |
| RE33,297 E | 8/1990 | Ramus et al. |
| 5,565,237 A | 10/1996 | Bartetzko |
| 5,596,335 A | 1/1997 | Dishart et al. |
| 5,670,966 A | 9/1997 | Dishart et al. |
| 5,748,155 A | 5/1998 | Kadunce et al. |
| 5,867,128 A | 2/1999 | Sauer |
| 6,103,998 A | 8/2000 | Kuno et al. |
| 6,103,999 A | 8/2000 | Nishio et al. |
| 6,164,984 A | 12/2000 | Schreiner |
| 6,576,845 B2 | 6/2003 | Von Alpen et al. |
| 6,602,371 B2 | 8/2003 | Veerasamy |
| 6,638,075 B2 | 10/2003 | Spaulding et al. |
| 6,774,342 B2 | 8/2004 | Capriotti et al. |
| 6,840,780 B1 | 1/2005 | Antaya et al. |
| 6,870,134 B2 | 3/2005 | Sol et al. |
| 6,903,698 B2 | 6/2005 | Silva |
| 6,926,552 B2 | 8/2005 | Mueller et al. |
| 6,932,620 B2 | 8/2005 | Ishiguro et al. |
| 7,091,913 B2 | 8/2006 | Lipka et al. |
| 7,121,835 B2 | 10/2006 | Silva |
| 7,132,625 B2 | 11/2006 | Voeltzel |
| 7,161,546 B2 | 1/2007 | Gelman et al. |
| 7,423,239 B2 | 9/2008 | Mann |
| 7,727,634 B2 | 6/2010 | Yacovone |
| 7,803,221 B2 | 9/2010 | Magdassi et al. |
| 7,955,470 B2 | 6/2011 | Kapp et al. |
| 7,955,696 B2 | 6/2011 | Baikerikar et al. |
| 8,022,333 B2 | 9/2011 | Maeuser |
| 8,299,400 B2 | 10/2012 | Prone et al. |
| 8,368,613 B2 | 2/2013 | Hornung |
| 8,373,067 B2 | 2/2013 | Derda et al. |
| 8,485,840 B2 | 7/2013 | Ziegler et al. |
| 8,563,899 B2 | 10/2013 | Baranski |
| 8,759,717 B2 | 6/2014 | Chamberlain |
| 8,905,778 B2 | 12/2014 | Jenrich et al. |
| 8,907,250 B2 | 12/2014 | Bressand et al. |
| 8,932,074 B2 | 1/2015 | Jenrich et al. |
| 9,011,628 B2 | 4/2015 | Elwakil et al. |
| 9,090,120 B2 | 7/2015 | Pires et al. |
| 9,125,247 B2 | 9/2015 | Li et al. |
| 9,158,172 B2 | 10/2015 | Sbar et al. |
| 9,356,366 B2 | 5/2016 | Moore |
| 9,504,174 B2 | 11/2016 | Mai-Krist et al. |
| 9,509,088 B2 | 11/2016 | Timmermann |
| 9,556,071 B2 | 1/2017 | Finley et al. |
| 9,630,396 B2 | 4/2017 | Orr |
| 9,986,669 B2 | 5/2018 | Uprety et al. |
| 9,997,846 B1 | 6/2018 | Salter et al. |
| 10,232,592 B2 | 3/2019 | Loccufier et al. |
| 10,263,362 B2 | 4/2019 | Imeson et al. |
| 10,278,237 B2 | 4/2019 | Krause et al. |
| 10,326,221 B2 | 6/2019 | Terashima et al. |
| 10,342,073 B2 | 7/2019 | Schoen |
| 10,348,011 B2 | 7/2019 | Reul et al. |
| 10,374,330 B1 | 8/2019 | Bennett et al. |
| 10,420,210 B2 | 9/2019 | Uprety et al. |
| 10,549,508 B2 | 2/2020 | Cloots et al. |
| 10,553,964 B2 | 2/2020 | Bennett et al. |
| 10,601,148 B2 | 3/2020 | Bulgajewski et al. |
| 10,660,161 B2 | 5/2020 | Schall et al. |
| 10,667,401 B2 | 5/2020 | Heikkinen et al. |
| 10,728,959 B2 | 7/2020 | Phan et al. |
| 10,752,782 B2 | 8/2020 | Loccufier |
| 10,792,955 B2 | 10/2020 | Ito et al. |
| 10,819,002 B2 | 10/2020 | Zhu et al. |
| 10,843,497 B2 | 11/2020 | Minamidate et al. |
| 10,843,662 B2 | 11/2020 | Tokiwa |
| 10,849,192 B2 | 11/2020 | Rogers et al. |
| 10,960,609 B2 | 3/2021 | Maclachlan |
| 11,027,528 B2 | 6/2021 | Laluet et al. |
| 11,031,671 B2 | 6/2021 | Xia et al. |
| 11,075,450 B2 | 7/2021 | Yong et al. |
| 11,097,978 B2 | 8/2021 | Hori et al. |
| 11,130,314 B2 | 9/2021 | Yoon et al. |
| 11,260,629 B2 | 3/2022 | Cleary et al. |
| 11,279,108 B2 | 3/2022 | Bard et al. |
| 11,362,473 B2 | 6/2022 | Yeh |
| 2006/0234523 A1 | 10/2006 | Baranski et al. |
| 2008/0206504 A1 | 8/2008 | Hayes et al. |
| 2008/0233371 A1 | 9/2008 | Hayes et al. |
| 2008/0286542 A1 | 11/2008 | Hayes et al. |
| 2010/0098917 A1 | 4/2010 | Lyon |
| 2010/0212959 A1 | 8/2010 | Flick |
| 2011/0109115 A1 | 5/2011 | Yamada et al. |
| 2011/0163569 A1 | 7/2011 | Yoneyama et al. |
| 2012/0067641 A1 | 3/2012 | Tokiwa et al. |
| 2012/0235879 A1 | 9/2012 | Eder et al. |
| 2013/0258436 A1 | 10/2013 | Podbelski et al. |
| 2016/0181689 A1* | 6/2016 | Bishop .................. H01Q 1/085 427/58 |
| 2016/0185101 A1 | 6/2016 | Lee et al. |
| 2016/0297222 A1 | 10/2016 | Allington et al. |
| 2017/0342282 A1 | 11/2017 | Torfs et al. |
| 2018/0257978 A1 | 9/2018 | Minamidate et al. |
| 2018/0311892 A1 | 11/2018 | Abbott, Jr. et al. |
| 2019/0141792 A1 | 5/2019 | Phan et al. |
| 2019/0356063 A1* | 11/2019 | Bennett ................ H01R 13/111 |
| 2019/0381786 A1 | 12/2019 | Watanabe |
| 2020/0122436 A1 | 4/2020 | Mannheim Astete et al. |
| 2020/0171800 A1 | 6/2020 | Cleary et al. |
| 2020/0215796 A1 | 7/2020 | Butler et al. |
| 2020/0239358 A1 | 7/2020 | Urata et al. |
| 2020/0290318 A1 | 9/2020 | Mannheim Astete et al. |
| 2020/0307166 A1 | 10/2020 | Varga et al. |
| 2020/0310014 A1 | 10/2020 | Bard et al. |
| 2020/0391577 A1 | 12/2020 | Bard et al. |
| 2020/0392358 A1 | 12/2020 | Courtet et al. |
| 2021/0043997 A1 | 2/2021 | Imeson et al. |
| 2021/0078299 A1 | 3/2021 | Keller |
| 2021/0178799 A1 | 6/2021 | Cofler et al. |
| 2021/0394488 A1 | 12/2021 | Sadakane et al. |
| 2022/0176681 A1 | 6/2022 | Voss |
| 2023/0211587 A1 | 7/2023 | Tu et al. |

FOREIGN PATENT DOCUMENTS

| | | |
|---|---|---|
| CN | 114981225 A | 8/2022 |
| DE | 102004052477 B4 | 6/2011 |
| DE | 102018103582 A1 | 8/2018 |
| EP | 2060546 A1 | 5/2009 |
| EP | 2168774 B1 | 2/2011 |
| EP | 2436527 A2 | 4/2012 |
| EP | 3034312 A1 | 6/2016 |
| EP | 1605729 B1 | 7/2018 |
| EP | 2054352 B1 | 1/2019 |
| EP | 1644295 B1 | 8/2020 |
| EP | 3549389 B1 | 2/2021 |
| EP | 3799587 A1 | 4/2021 |
| EP | 3515654 B1 | 6/2021 |
| JP | 2002353622 A | 12/2002 |
| JP | 2003017171 A | 1/2003 |
| JP | 2013073810 A | 4/2013 |
| JP | 6753414 B2 | 9/2020 |
| WO | 9118757 A1 | 12/1991 |
| WO | 2008068241 A1 | 6/2008 |
| WO | 2012022904 A1 | 2/2012 |
| WO | 2012028820 A1 | 3/2012 |

(56) References Cited

FOREIGN PATENT DOCUMENTS

| | | |
|---|---|---|
| WO | 2012066886 A1 | 5/2012 |
| WO | 2018215317 A1 | 11/2018 |
| WO | 2019186512 A1 | 10/2019 |
| WO | 2021084279 A1 | 5/2021 |
| WO | 2021090243 A1 | 5/2021 |
| WO | 2021105422 A1 | 6/2021 |
| WO | 2021110723 A1 | 6/2021 |
| WO | 2021204551 A1 | 10/2021 |
| WO | 2021209433 A1 | 10/2021 |
| WO | 2021220206 A1 | 11/2021 |
| WO | 2021233703 A1 | 11/2021 |
| WO | 2021233807 A1 | 11/2021 |
| WO | 2021239937 A1 | 12/2021 |
| WO | 2022006417 A1 | 1/2022 |
| WO | 2022057951 A1 | 3/2022 |
| WO | 2023058617 A1 | 4/2023 |
| WO | 2023058618 A1 | 4/2023 |

OTHER PUBLICATIONS

English language abstract for JP 6753414 B2 extracted from espacenet.com database on Nov. 25, 2024, 1 page.

English language abstract and machine-assisted English translation for CN 114765970 A extracted from espacenet.com database on Oct. 27, 2023, 16 pages.

English language abstract and machine-assisted English translation for CN 114981225 A extracted from espacenet.com database on Oct. 27, 2023, 22 pages.

English language abstract and machine-assisted English translation for WO 2023/058617 A1 extracted from espacenet.com database on Oct. 27, 2023, 26 pages.

English language abstract and machine-assisted English translation for WO 2023/058618 A1 extracted from espacenet.com database on Oct. 27, 2023, 29 pages.

English language abstract and machine-assisted English translation for JP 2013-073810 A extracted from espacenet.com database on Feb. 18, 2025, 36 pages.

The Usglass News Network (USGNN), "NSG Group and University of Cambridge Sowing Seeds for Future Glass Applications", https://www.usglassmag.com/2020/10/nsg-group-and-university-of-cambridge-sowing-seeds-for-future-glass-applications/, Oct. 23, 2020, 2 pages.

English language abstract and machine-assisted English translation for CN 1106335291 A extracted from espacenet.com database on Jul. 13, 2022, 9 pages.

English language abstract and machine-assisted English translation for DE 10 2004 052 477 B4 extracted from espacenet.com database on Jul. 15, 2022, 7 pages.

English language abstract and machine-assisted English translation for JP 2003-017171 A extracted from espacenet.com database on Jul. 13, 2022, 12 pages.

English language abstract for EP 1 644 295 B1 and machine-assisted English translation for equivalent WO 2005/003048 A1 extracted from espacenet.com database on Jul. 13, 2022, 12 pages.

English language abstract for EP 3 515 654 B1 extracted from espacenet.com database on Jul. 13, 2022, 2 pages.

English language abstract and machine-assisted English translation for WO 2012/022904 A1 extracted from espacenet.com database on Jul. 13, 2022, 10 pages.

English language abstract and machine-assisted English translation for WO 2012/028820 A1 extracted from espacenet.com database on Jul. 13, 2022, 22 pages.

English language abstract for WO 2012/066886 A1 and machine-assisted English translation for equivalent JP 2012-113840 A extracted from espacenet.com database on Jul. 15, 2022, 11 pages.

English language abstract and machine-assisted English translation for WO 2018/215317 A1 extracted from espacenet.com database on Jul. 15, 2022, 26 pages.

English language abstract and machine-assisted English translation for WO 2021/105422 A1 extracted from espacenet.com database on Jul. 13, 2022, 13 pages.

English language abstract and machine-assisted English translation for WO 2021/204551 A1 extracted from espacenet.com database on Jul. 13, 2022, 23 pages.

English language abstract and machine-assisted English translation for WO 2021/209433 A1 extracted from espacenet.com database on Jul. 13, 2022, 19 pages.

English language abstract and machine-assisted English translation for WO 2021/233703 A1 xtracted from espacenet.com database on Jul. 13, 2022, 9 pages.

English language abstract and machine-assisted English translation for WO 2022/057951 A1 extracted from espacenet.com database on Jul. 13, 2022, 16 pages.

U.S. Appl. No. 17/860,411, filed Jul. 8, 2022.
U.S. Appl. No. 17/860,488, filed Jul. 8, 2022.
U.S. Appl. No. 17/860,576, filed Jul. 8, 2022.

English language abstract for DE 10 2018 103 582 A1 extracted from espacenet.com database on Dec. 10, 2023, 1 page.

* cited by examiner

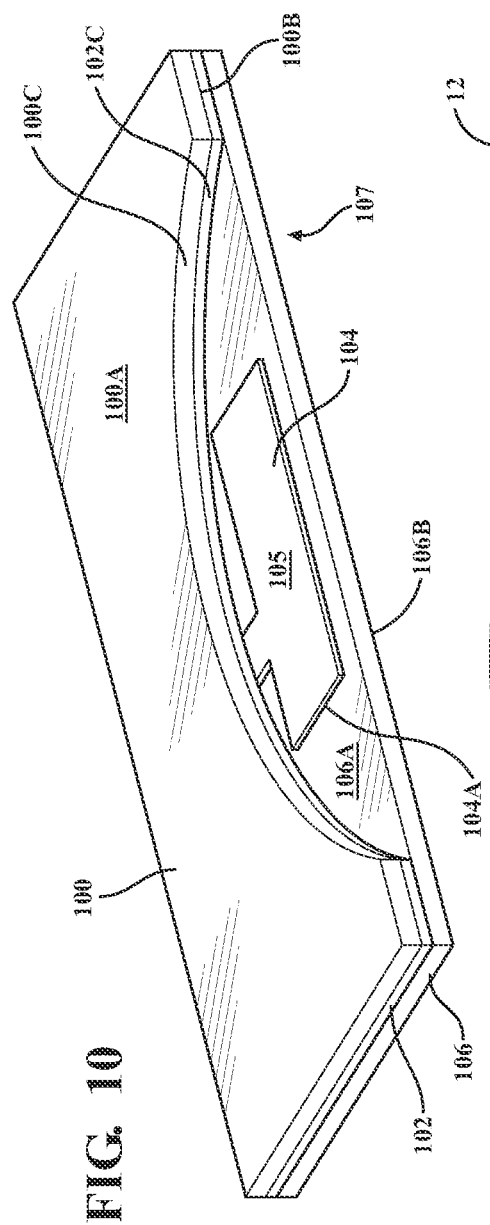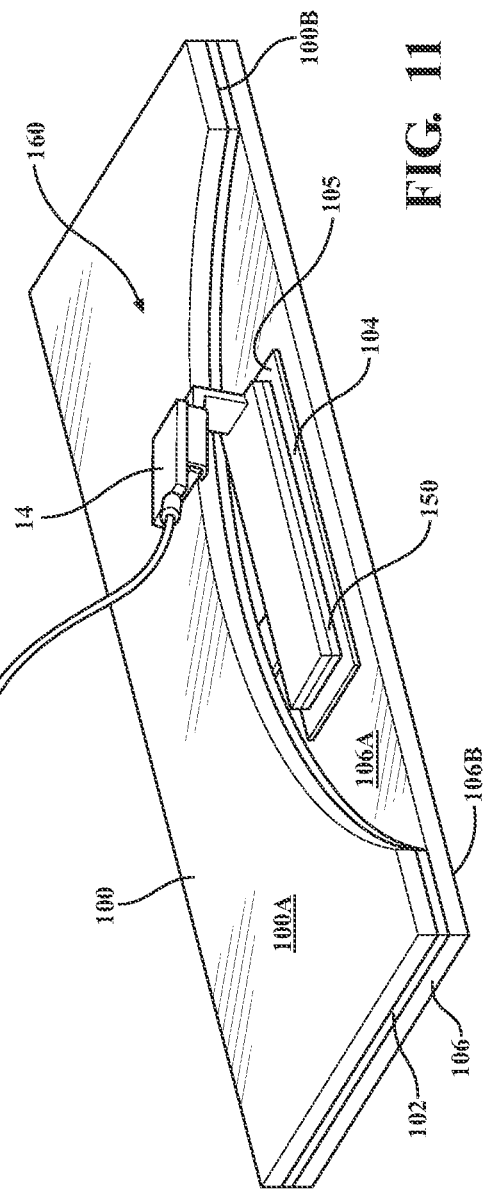

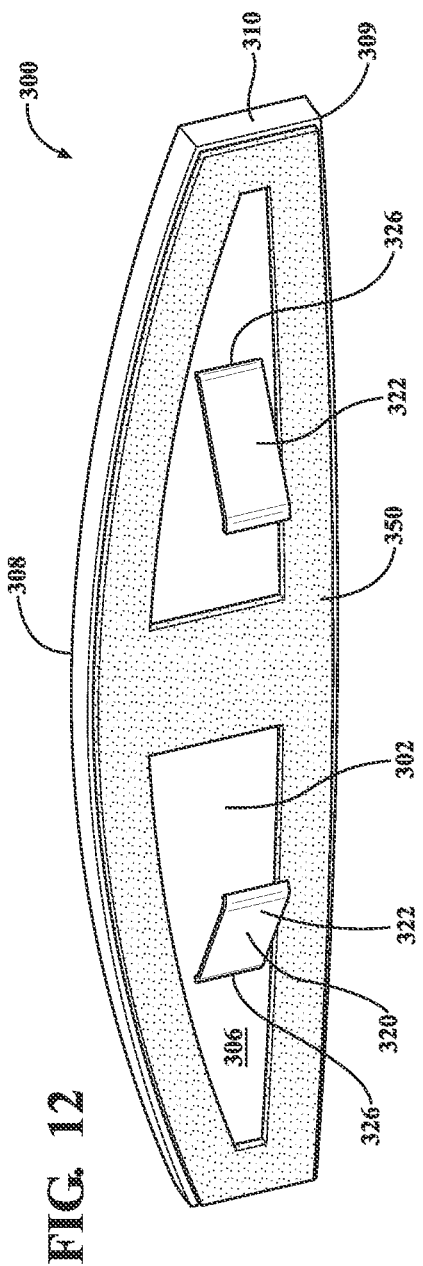

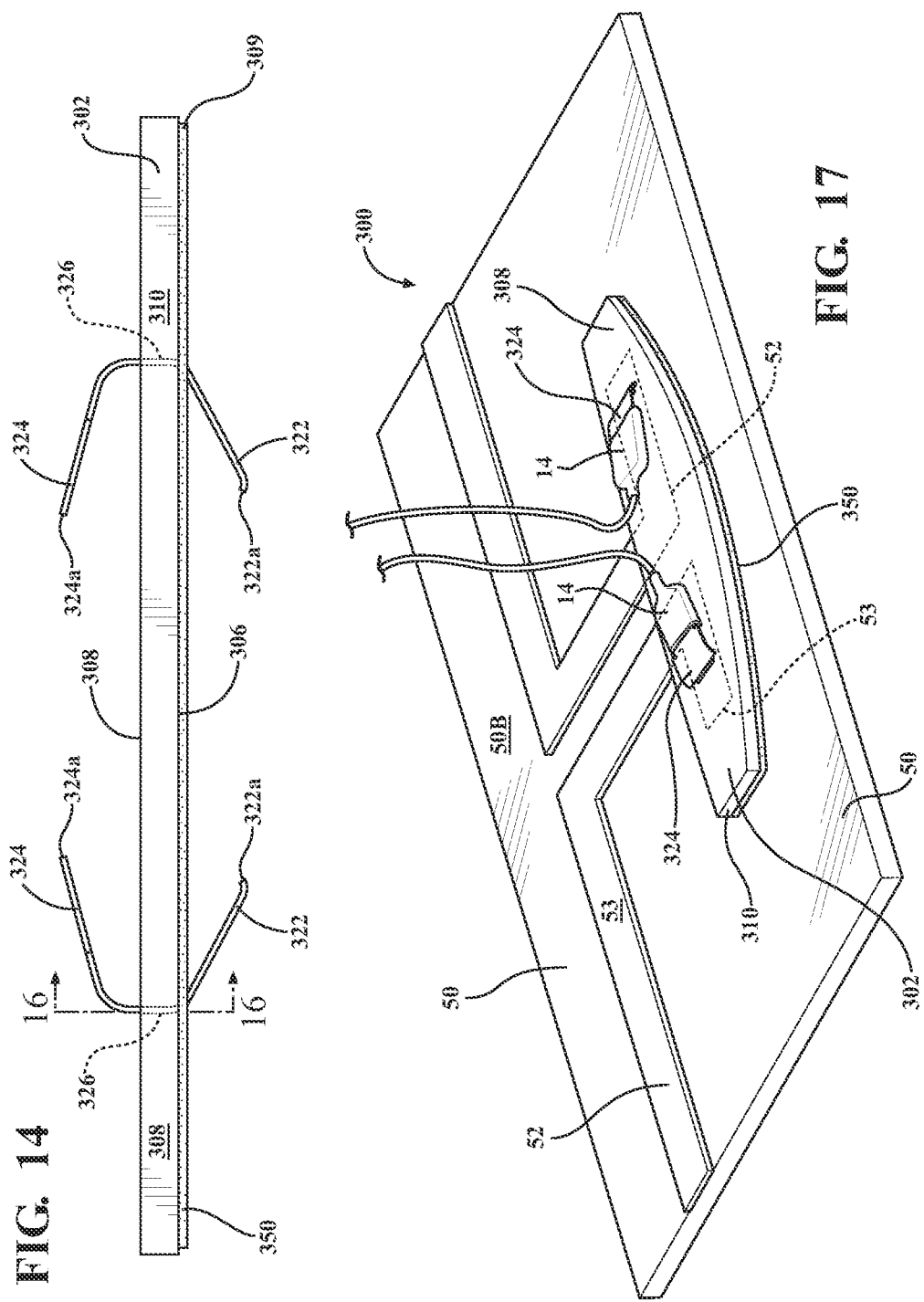

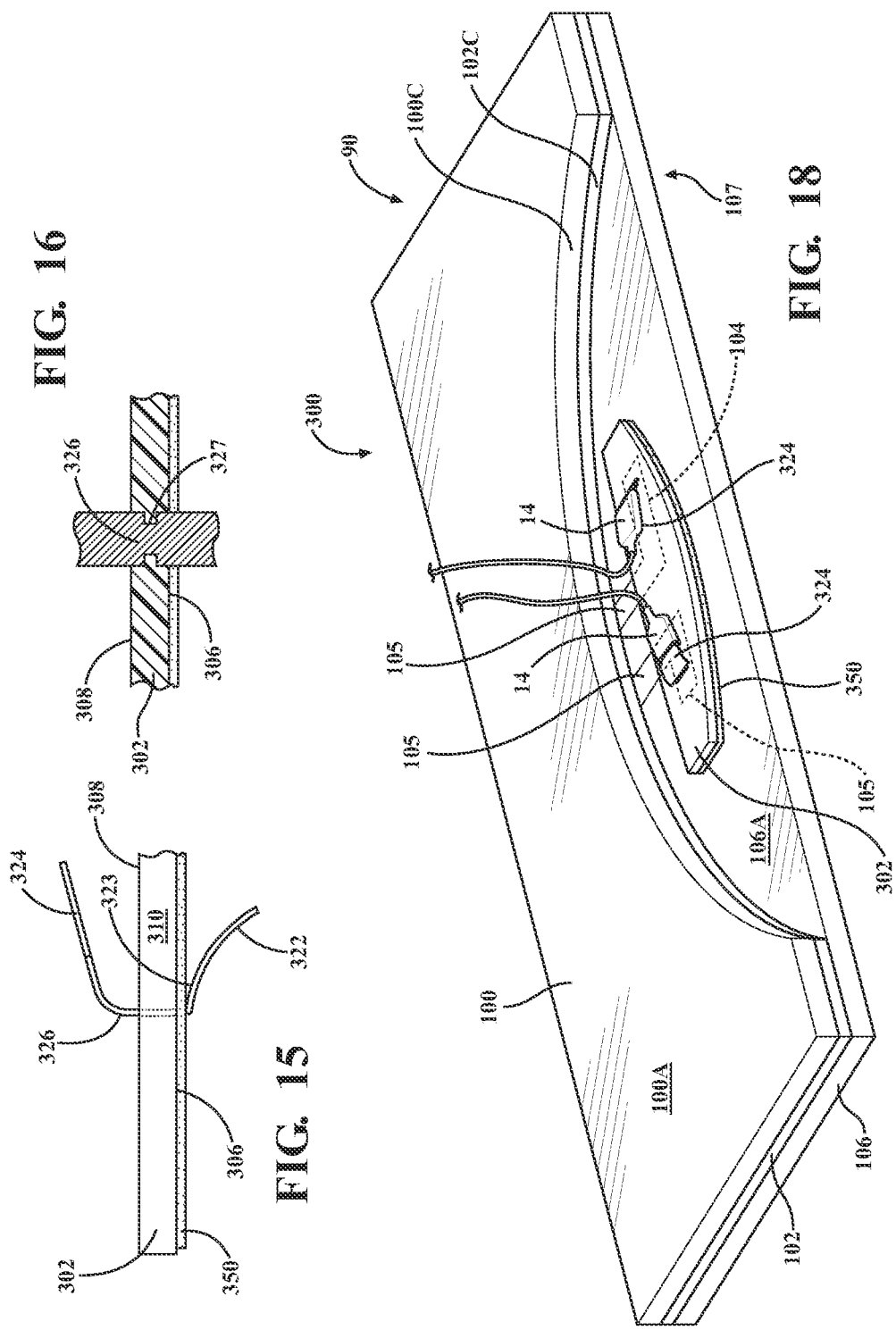

METHOD OF MANUFACTURING A WINDOW ASSEMBLY WITH A SOLDERLESS ELECTRICAL CONNECTOR

TECHNICAL FIELD

The present disclosure relates generally to window assemblies, and more specifically to window assemblies with an electrically insulated, solderless electrical connector.

BACKGROUND

Window assemblies for vehicles are often functionalized to include one or more conductive features disposed on a transparent substrate. Commonly, these conductive features are printed circuits formed by depositing a conductive ink, often including silver, on the transparent substrate, often comprised of glass. These conductive features may include, for example, antennas and heating elements. To power these conductive features, a wiring harness is typically connected to these conductive features via an electrical connector. In typical applications, the electrical connector is both mechanically and electrically bonded to the conductive feature and to the underlying transparent substrate through a solder joint that is formed between the electrical connector and the conductive feature.

Typical conductive inks are not sufficiently heat resistant to the temperatures required for conventional soldering applications, which can exhibit peak temperatures at the solder/ink interface between 150° C.-330° C. Accordingly, the bonding interface between the conductive ink and transparent substrate is often compromised due to conventional soldering applications.

In addition, conductive inks that are free of ceramic frit and instead comprise organic compounds typically possess much lower adhesion to these transparent substrates and thus cannot support traditional soldering applications. Although it is believed that the bonding performance of conductive inks can be improved via primers, the organic nature and lack of frit in the conductive inks suggests it will be difficult to improve adhesion enough to provide sufficient bonding performance that is capable of withstanding soldering. Therefore, an improved solderless electrical connector and a method of forming a solderless connector are needed.

SUMMARY

A method of manufacturing a glass assembly having a solderless electrical connector is provided herein. The method includes forming a glass substrate that is curved. The method also includes applying a conductive ink having a thermal degradation temperature onto a surface of the curved glass substrate to form an applied conductive ink on the surface of the glass substrate. The method also includes applying an adhesive onto the surface of the curved glass substrate adjacent to the applied conductive ink. The method further includes curing the adhesive at a temperature below the thermal degradation temperature of the applied conductive ink to form the solderless electrical connector in electrical contact with the applied conductive ink.

The method provided herein enables the electrification of the applied conductive inks through a solderless electrical connector without compromising the conductive ink.

BRIEF DESCRIPTION OF THE DRAWINGS

Advantages of the present disclosure will be readily appreciated as the same becomes better understood by reference to the following detailed description when considered in connection with the accompanying drawings.

FIG. 10 is an assembled view of FIG. 9.

FIG. 11 is a perspective view of the laminated window assembly of FIG. 10 and further including a solderless electrical connector electrically connected to the conductive ink opposite the inner transparent substrate in accordance with another exemplary embodiment.

FIG. 12 is a bottom perspective view of a solderless electrical connectors in accordance with another exemplary embodiment.

FIG. 13. is a top perspective view of FIG. 12.

FIG. 14 is a front view of FIG. 12 in accordance with one configuration of the solderless electrical connector.

FIG. 15 is a partial front view of FIG. 12 in accordance with another configuration of the solderless electrical connector.

FIG. 16 is a cross-sectional schematic view of FIG. 14 taken along line 14-14 in accordance with one exemplary embodiment of the solderless electrical connector.

FIG. 17 is a perspective view of a portion of the window assembly of FIG. 3 having a conductive ink applied thereto and further including the solderless electrical connector of FIGS. 12-14 electrically connected to a respective electrical connection component and to the conductive ink.

FIG. 18 is a perspective view of a portion of the transparent laminated window assembly of FIG. 9 and further including the solderless electrical connector of FIGS. 12-14 electrically connected to a respective electrical connection component and to the conductive ink applied to the inner surface of the inner transparent substrate.

DETAILED DESCRIPTION

Figure 1:
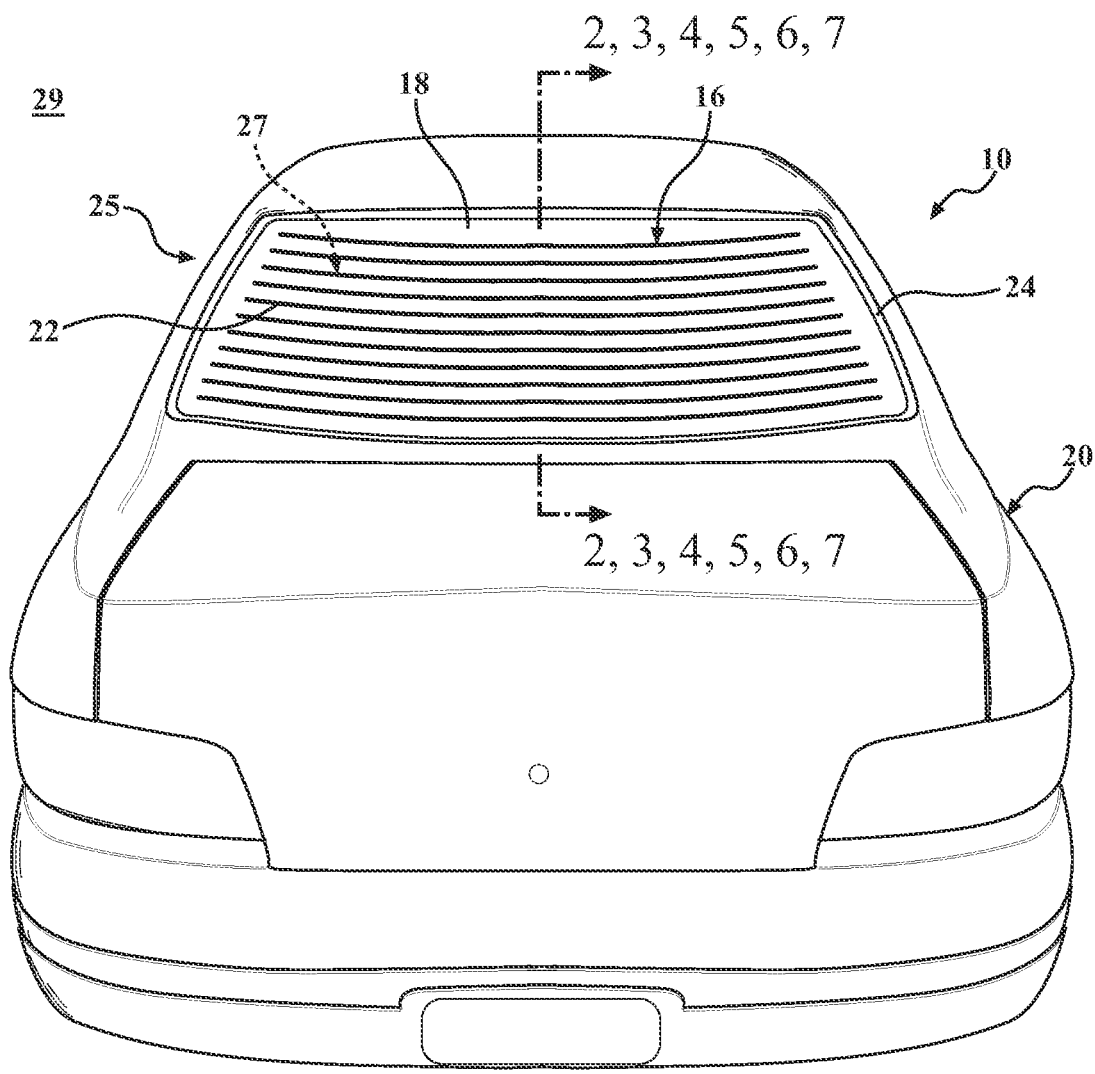
FIG. 1 is a rear perspective view of a vehicle including a rear window assembly formed according to the present disclosure.

Referring to the drawings, wherein like reference numerals are used to identify like or identical components in the various views, FIG. 1 schematically illustrates a window assembly 10 with a conductive feature 16 formed on a transparent substrate 18. Although not required, the window assembly 10 may be used in an automotive context, such as in a vehicle 20, where the conductive feature 16 can function to provide an electrical pathway along a portion of the transparent substrate 18. Of course, it is to be appreciated that the window assembly 10 can be used outside the automotive context.

As defined herein, the term "transparent", also referred to as "substantially transparent", as used with respect to the substrate, refers to a material that allows 70% or more of light transmission in a predefined visible light range to travel therethrough. Unless otherwise indicated, the predefined visible light range is the segment of the electromagnetic spectrum that the human eye can view. More simply, this range of wavelengths is called visible light. Typically, the human eye can detect wavelengths from 380 to 780 nanometers, and thus the predefined visible light range as defined herein refers to wavelengths of light from 380 to 780 nanometers unless otherwise indicated.

The conductive feature 16, as will be described in the various exemplary embodiments below, is defined by a conductive ink 52 (see FIGS. 2-3, for example) or 104 (see FIGS. 4-7, for example) that is applied to one or more surfaces of the transparent substrate 18. The conductive feature 16 may define one or more bus bars, antennas, or heating elements. In addition, the conductive feature 16 may be used with one or more electrical components 22 which are integrated within or directly coupled to the conductive feature 16. For example, the one or more electrical components 22 may include circuit resistive heaters operative to locally heat and/or defrost a portion of the transparent substrate 18. Additionally, or alternatively, the one or more electrical components 22 may include one or more antennas, LED lights, camera modules, or other such electrical devices. It should be appreciated that an electrical connection component 14, shown in the various embodiments as a wire harness 14, may transfer power from a separate power supply to the conductive feature 16 and the associated one or more electrical components 22. As provided hereinafter, the terms electrical connection component 14 and wire harness 14 may be used interchangeably.

In certain embodiments, the conductive feature 16 may also include one or more electrical conductors 24 or wires that are bonded to or integrally formed as an outer layer of the substrate 18. The one or more electrical conductors 24 may include, for example, a conductive layer of silver. In other embodiments, the electrical conductor 24 may be made of other conductive metals in addition to, or instead of, silver. The electrical conductor 24 may be a film, a coating, and/or may take any other form so long as the electrical conductor 24 is conductive and serves any function known in the art for such electrical conductors. The electrical conductor 24 may be porous and/or nonporous. In various embodiments, the electrical conductor 24 is a porous silver film. In certain embodiments, the electrical conductor 24 is an electrical extension of the electrical component 22 and/or the conductive feature 16. In other embodiments, the electrical conductor 24 is separately applied to the substrate 18 and is electrically coupled with the electrical component 22 and/or with the conductive feature 16.

The window assembly 10, in alternative embodiments, also has a solderless electrical connector 12 (see FIGS. 8 and 11) or 300 (see FIGS. 15 and 16) that mechanically and electrically couples, or connects, the electrical connection component 14, such as the wire harness 14 as shown herein, in electrical contact with the conductive feature 16.

Figure 2:
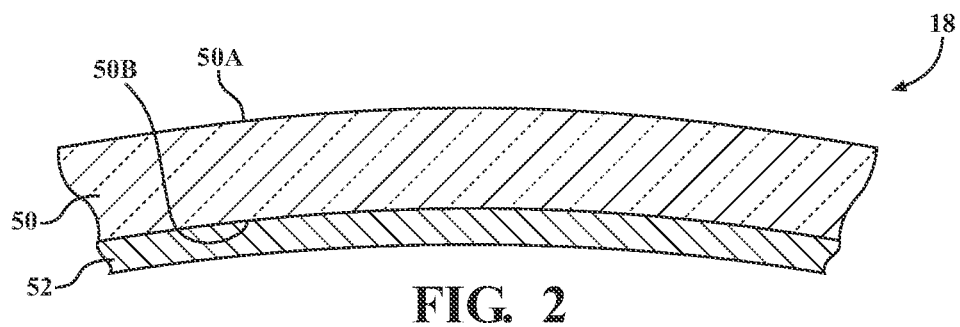
FIG. 2 is a cross-sectional schematic view of the window assembly of FIG. 1 taken along line 2-2 including a single pane of glass and a conductive ink applied thereto in accordance with one exemplary embodiment.
Figure 3:
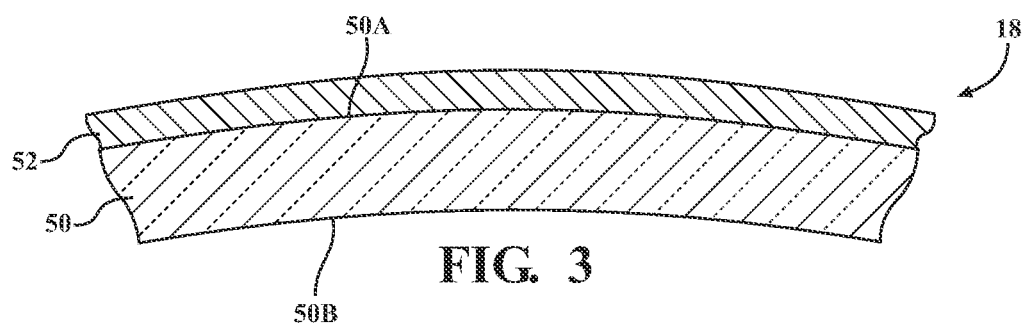
FIG. 3 is a cross-sectional schematic view of the window assembly of FIG. 1 taken along line 3-3 including a single pane of glass and a conductive ink applied thereto in accordance with another exemplary embodiment.

In certain embodiments, such as shown in FIGS. 2 and 3, the transparent substrate 18 may include a pane of glass 50, here shown as a single pane of glass 50, that includes an outwardly facing surface 50A (also referred to as a "P1 surface") and an opposing inwardly facing surface 50B (also referred to as a "P2 surface"). In other words, the glass substrate 50 includes first and second opposing surfaces 50A and 50B. When installed in an opening 25 of the vehicle 20, the inwardly facing surface 50B is positioned adjacent to the interior region 27 of the vehicle 20, sometimes referred to as the passenger compartment 27 of the vehicle 20, while the exterior facing surface 50A is positioned towards the exterior 29 of the vehicle 20.

In one example of forming the transparent substrate 18 that is curved, the curved transparent substrate 18 is initially formed as a flat glass sheet. The flat glass sheet may be produced using any suitable flat glass manufacturing process including, but not limited to, a float process. The flat glass sheet may be comprised of any suitable glass composition including, but not limited to, soda-lime glass, aluminosilicate glass, borosilicate glass, boro-aluminosilicate glass, and the like. After the formation of the flat glass sheet, the flat glass sheet is bent to form the curved transparent substrate 18. The flat glass sheet may be bent using any suitable glass bending process including, but not limited to, press bending, gravity bending (i.e., sag bending), roll forming, or cold bending. The flat glass sheet may be bent into any geometry suitable for the desired application.

In other examples, the curved transparent substrate 18 is formed as a curved substrate at the outset, as opposed to producing and subsequently bending the flat glass sheet. The curved transparent substrate may be produced using any suitable curved glass manufacturing process including, but not limited to, glass blow molding. Similar to the flat glass sheet described above, in this example, where the curved transparent substrate 18 is formed at the outset, the curved transparent substrate 18 may be comprised of any suitable glass composition including, but not limited to, soda-lime glass, aluminosilicate glass, borosilicate glass, boro-aluminosilicate glass, and the like.

In some embodiments, the transparent substrate 18 may include various additives to alter the transmissivity of the transparent substrate 18, for example, to provide various levels of tint or coloration while still maintaining the transparent substrate 18 as "transparent" or "substantially transparent" as described above.

In other embodiments, the transparent substrate 18 may alternatively be a single pane of a polymeric substrate that is entirely made from a transparent polymeric material such as polymethyl methacrylate, polycarbonate, polyvinyl butyral, or the like.

In still further embodiments, such as shown in FIGS. 4-7, as opposed to being in the form of a single pane of glass 50 or a single pane of the polymeric substrate, the transparent substrate 18 is in the form of a laminated window assembly 90 that includes an inner transparent substrate 106 and an outer transparent substrate 100 and an interlayer 102 disposed between the inner and outer transparent substrates 106, 100. In certain embodiments, the interlayer 102 bonds the inner and outer transparent substrates 106, 100 and allows the laminated window assembly 90 to retain pieces of the inner and outer transparent substrates 106, 100 upon impact or breakage. When installed in the opening 25 of the vehicle 20, the inner transparent substrate 106 is positioned adjacent to the interior region 27, sometimes referred to as the passenger compartment 27 of the vehicle 20, while the outer transparent substrate 100 is positioned towards the exterior 29 of the vehicle 20.

In these embodiments, the inner transparent substrate 106 includes opposing outwardly and inwardly facing surfaces 106A and 106B (i.e., first and second opposing surfaces 106A and 106B), and the outer transparent substrate 100 includes opposing outwardly and inwardly facing surfaces 100A and 100B (i.e., first and second opposing surfaces 100A and 100B). Similarly, the interlayer 102 includes opposing outwardly and inwardly facing surfaces 102A and 102B (i.e., first and second opposing surfaces 102A and 102B). As described herein, the outwardly facing surface 100A may sometimes be referred to as P1, while inwardly facing surface 100B may sometimes be referred to as P2. Similarly, the inwardly facing surface 106A may sometimes be referred to as P3, while outwardly facing surface 106B may sometimes be referred to as P4.

In certain embodiments, the respective inner and outer transparent substrates 106, 100 are formed from the same materials described above with respect to the transparent substrate 18 (e.g. a single pane of glass or a single polymeric substrate). The inner and outer transparent substrates 106, 100 may be comprised of the same or different materials. In certain embodiments, for example, the inner and outer transparent substrates 106, 100 are panes of glass that are substantially transparent. However, in other embodiments, the inner and/or outer transparent substrates 106, 100 may be plastic, fiberglass, or any other suitable substantially transparent polymeric material such as those described above. In other embodiments, the inner and outer transparent substrates 106, 100 are panes of glass that are less transparent. For example, where the laminated window assembly 90 is a privacy glass, the transparency of the laminated window assembly 90 is substantially reduced, and thus allows less than 70% light transmission in a predefined wavelength range, such as from greater than 0 to 70% light transmission at the predefined wavelength range.

Typically, the interlayer 102 is substantially transparent to light and includes a polymer or thermoplastic resin, such as polyvinyl butyral (PVB). However, other suitable materials for implementing the interlayer 102 may be utilized. Similar to the inner and outer transparent substrates 106, 100, the interlayer 102 is also substantially transparent or otherwise transparent to light. Accordingly, the laminated window assembly 90 that includes the interlayer 102 between the inner and outer transparent substrates 106, 100 may also substantially be transparent or otherwise transparent to light.

In each of the embodiments illustrated, the window assembly 10, whether in the form of a single transparent substrate 18 or in the form of a laminated window assembly 90, is curved such that each component of the window assembly 10 includes an inner curved surface (such as 50B for the single pane of glass 50 of FIGS. 2-3 or 106B for the laminated window assembly 90 of FIGS. 4-7) and an outer curved surface (such as 50A for the single pane of glass 50 of FIGS. 2-3 or 100A for the laminated window assembly 90 of FIGS. 4-7). Accordingly, in each of the embodiments illustrated, the respective components of the curved transparent substrate 18 define an outwardly facing surface and an opposing inwardly facing surface that are each curved.

Further, in the vehicle 20 illustrated in FIG. 1, the inner curved surface of the transparent substrate 18 is positioned towards the interior region 27 of the vehicle 20 so as to further define the boundary of the interior region 27, and the outer curved surface is positioned towards the exterior 29 of the vehicle 20.

In certain embodiments, such as in the embodiments illustrated in FIGS. 2-3 and as described below, the conductive feature 16 includes the conductive ink 52 that is applied to one or both of the outwardly and inwardly facing surfaces of the curved transparent substrate 18 (such as 50A, 50B of the single pane of glass 50). In one example, the conductive ink 52 comprises conductive particles and a ceramic frit. In another example, the conductive ink 52 comprises a thermally curable organic monomer and conductive particles (e.g. silver nanoparticles or the like) dispersed in the organic monomer. It should be appreciated that in other examples, the organic monomer can instead be an oligomer or a combination of monomers and oligomers. In yet another example, the conductive ink 52 comprises a metal-organic complex including a silver-organic compound or any other suitable metal-organic complex that includes an organic component and a conductive metal component, such as a copper-organic compound, or the like.

In certain embodiments, the applied conductive ink 52 is photocured and/or thermally cured to form a cured conductive ink 52 or is sintered to form a sintered conductive ink on one or both of the outwardly and inwardly facing surfaces of the curved transparent substrate 18 (such as 50A, 50B of the single pane of glass 50).

More specifically, one example of curing the conductive ink 52 includes thermally-curing the conductive ink 52. Any suitable thermal curing device is contemplated to thermally cure the conductive ink 52 including, but not limited to, an oven, a heat gun, or an IR heater. Thermally-curing in the context of the present disclosure involves subjecting the curved transparent substrate 18 to a temperature sufficient to cure the conductive ink 52 on a surface of the curved transparent substrate 18.

In some examples, the curing temperature for curing the conductive ink 52 is selected in view of a thermal degradation temperature of the conductive ink 52. More specifically, a curing temperature is selected that is below the thermal degradation temperature of the conductive ink 52 that is applied on the transparent substrate 18 to prevent the conductive ink 52 from burning off of the curved transparent substrate 18 and to minimize optical distortion of the curved transparent substrate 18. For instance, the conductive ink 52 may have a thermal degradation temperature once applied on the transparent substrate 18 of 210 degrees Celsius. Accordingly, a curing temperature may be selected that is below 210 degrees Celsius, such as 200 degrees Celsius.

In another example, the conductive ink 52 includes a metal-organic complex that is thermally cured. The metal-organic complex may comprise a silver-organic compound or any other suitable metal-organic complex that includes an organic component and a conductive metal component, such as a copper-organic compound, or the like. In this example, after the conductive ink 52 including the metal-organic complex is applied to a surface of the curved transparent substrate 18, the conductive ink 52 may be exposed to a temperature sufficient to volatize the organic component of the metal-organic complex such that only the metal particles (e.g. the silver particles) remain on the surface of the curved transparent substrate 18.

Another example of curing the conductive ink 52 includes photo-curing the conductive ink 52 with a UV curing device. In this example, the conductive ink 52 is a photo-curable conductive ink 52. The photo-curable conductive ink 52 may include a photoinitiator, an organic monomer, and conductive particles (e.g. silver nanoparticles or the like) dispersed in the organic monomer. It should be appreciated that in other examples, the organic monomer can instead be an oligomer or a combination of monomers and oligomers. The photoinitiator may include any suitable compound that initiates polymerization of the organic monomer in response to exposure to UV light. For example, the photoinitiator may be a compound that creates a reactive species (e.g. free radicals, cations, or anions) when exposed to UV light that initiates polymerization of the organic monomer and/or oligomer. Accordingly, in the present example, curing the conductive ink 52 includes exposing the conductive ink 52 to the UV curing device to activate the photoinitiator to initiate polymerization of the organic monomer to cure the conductive ink.

In one example, the UV curing device is a UV light emitting diode that emits UV light. For example, the UV curing device may emit UV light having a wavelength of 315 nanometers to 400 nanometers (generally known as the UV-A spectrum). The UV light emitting diode may emit UV light having a narrower spectrum, such as emitting UV light that substantially has a wavelength of 385 nanometers. Any wavelength within the UV spectrum is contemplated.

In certain embodiments, curing the conductive ink 52 may be initiated shortly after applying the conductive ink 52 to prevent running or smudging of the conductive ink 52. For example, curing the conductive ink 52 may be initiated within a time period from zero seconds to 5 seconds after applying the conductive ink 52. Alternatively, the curing may be initiated within less than 5 seconds after applying the conductive ink 52, less than 4 seconds after applying the conductive ink 52, less than 3 seconds after applying the conductive ink 52, less than 2 seconds after applying the conductive ink 52, or less than 1 second after applying the conductive ink 52.

In still further embodiments, the conductive ink 52 is sintered after application. A sintering process is a process in which the applied conductive ink 52 is compacted and formed into a solid mass using heat or pressure without melting to the point of liquefication, but wherein the particles of the conductive ink 52 may coalesce to form the aforementioned solid mass. Accordingly, during the sintering process, the applied conductive ink 52 may be heated to a temperature sufficient to sinter the applied conductive ink 52 without melting the applied conductive ink 52, hereinafter referred to as being heated to a sintering temperature. Alternatively, during the sintering process, the applied conductive ink 52 is subjected to sufficient pressure to sinter the applied conductive ink 52 without melting the applied conductive ink 52, hereinafter referred to as being pressed to a sintering pressure. In still further alternative embodiments, the sintering process may be a combination of heating and applying pressure to the applied conductive ink 52 sufficient to sinter the applied conductive ink 52, therein forming a sintered conductive ink on the surface of the curved substrate.

In still further embodiments, the conductive ink 52 may be a conductive silver ink 52 including silver nanoparticles. In certain embodiments, the silver nanoparticles of the conductive silver ink 52 may have an average particle size of from 1 to 100 nanometers. One non-limiting conductive silver ink 52, 104 that may be used is a silver nanoparticle ink that is commercially available from Fujifilm having a sintering temperature of 80 degrees Celsius for 5 minutes. In these embodiments, the conductive ink 52, 104 is photo-cured, thermally cured, sintered, or dried after application, as described above. For example, the conductive silver ink 52 may be applied and sintered to a line width of from 10 micrometers to 1 millimeter on the surface of the curved transparent substrate 18.

Alternatively, in other embodiments the conductive ink 52 that is applied to one or more outwardly and inwardly facing surfaces of the curved transparent substrate 18 (such as 50A, 50B of the single pane of glass 50) remains uncured and un-sintered and is simply dried and otherwise adhered onto the respectively outwardly and/or inwardly facing surfaces.

For ease of description below, where the description of the conductive ink 52 is simply referred to as being applied to the curved transparent substrate 18 or is simply referred to as a conductive ink 52 such as with respect to any of FIGS. 2-16, it is understood that the applied conductive ink 52 specifically includes applied conductive inks 52 that are subsequently cured, sintered, or simply dried on to the curved transparent substrate 18 unless otherwise specifically indicated.

FIGS. 2-3 illustrate examples of the conductive ink applied to the curved transparent substrate 18. In these examples, the curved transparent substrate 18 is the single pane of glass 50. In the example illustrated in FIG. 2, the conductive ink 52 is applied to the inwardly facing surface 50B of the curved glass pane 50. Meanwhile, in the example of FIG. 3, the conductive ink 52 is applied to the outwardly facing surface 50A of the curved glass pane 50. It is contemplated that the conductive ink 52 may applied to both of the outwardly facing surface and inwardly facing surface of the curved transparent substrate 18.

In certain alternative embodiments, such as in the embodiments illustrated in FIGS. 4-7 and described below in which the transparent substrate 18 is in the form of a laminated window assembly 90, the conductive feature 16 includes a conductive ink 104 that is applied to one of the outwardly or inwardly facing surfaces, 100A, 106A, 100B and 106B of the respective inner and outer transparent substrates 106, 100 of the laminated window assembly 90. In these embodiments, the step of laminating the interlayer 102 to each of the inner and outer transparent substrates 106, 100 is done after the step of applying and/or curing the conductive ink 104. The conductive ink 104 can have the same, or different, composition from the conductive ink 52.

Figure 4:
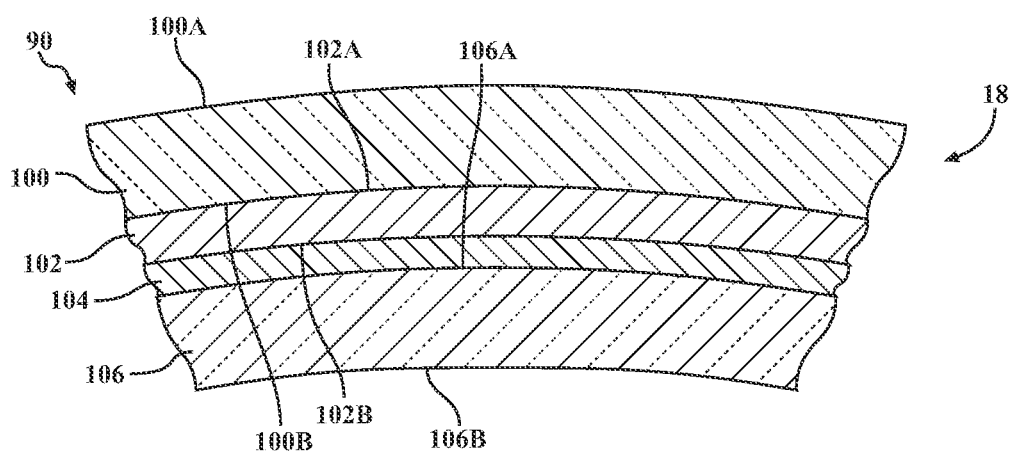
FIG. 4 is a cross-sectional schematic view of the window assembly of FIG. 1 taken along line 4-4 including a laminated window assembly having a conductive ink applied thereto in accordance with another exemplary embodiment.

Referring first to FIG. 4, in one embodiment, the conductive ink 104 is applied to the outwardly facing surface 106A of the inner transparent substrate 106 and is thus disposed between the inner transparent substrate 100 and the interlayer 102.

Figure 5:
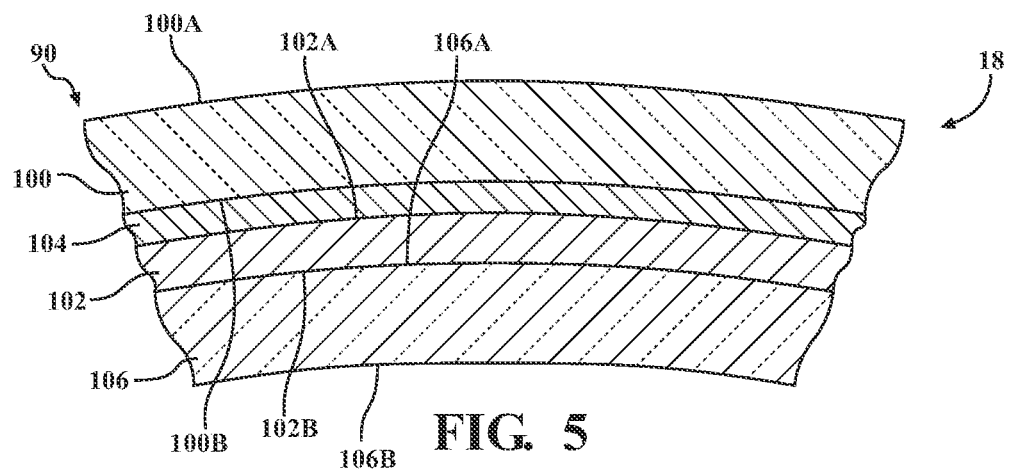
FIG. 5 is a cross-sectional schematic view of the window assembly of FIG. 1 taken along line 5-5 including a laminated window assembly having a conductive ink applied thereto in accordance with another exemplary embodiment.

In FIG. 5, in another embodiment, the conductive ink 104 is applied to the inwardly facing surface 100B of the outer transparent substrate 100 and is thus disposed between the outer transparent substrate 100 and the interlayer 102.

Figure 6:
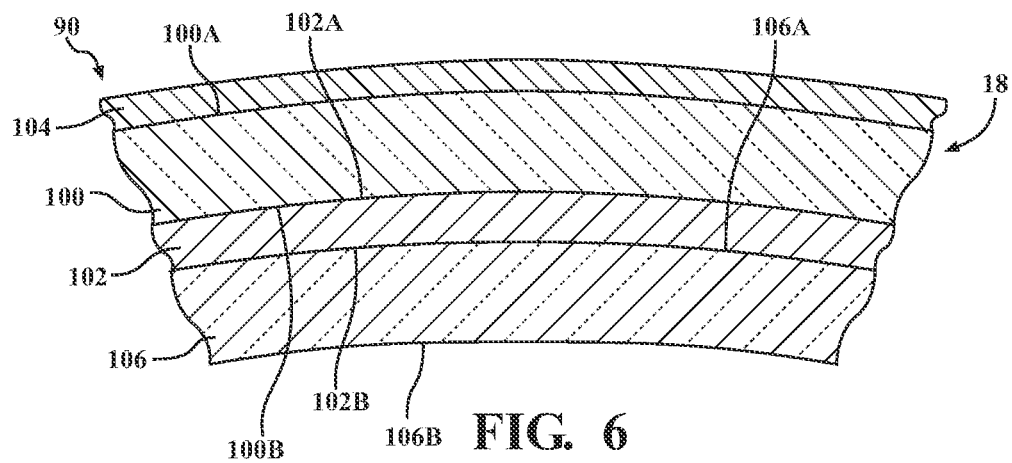
FIG. 6 is a cross-sectional schematic view of the window assembly of FIG. 1 taken along line 6-6 including a laminated window assembly having a conductive ink applied thereto in accordance with another exemplary embodiment.

In FIG. 6, in another embodiment, the conductive ink 104 is applied to the outwardly facing surface 100A of the outer transparent substrate 100 and thus the outer transparent substrate 100 is disposed between the interlayer 102 and the conductive ink 104.

Figure 7:
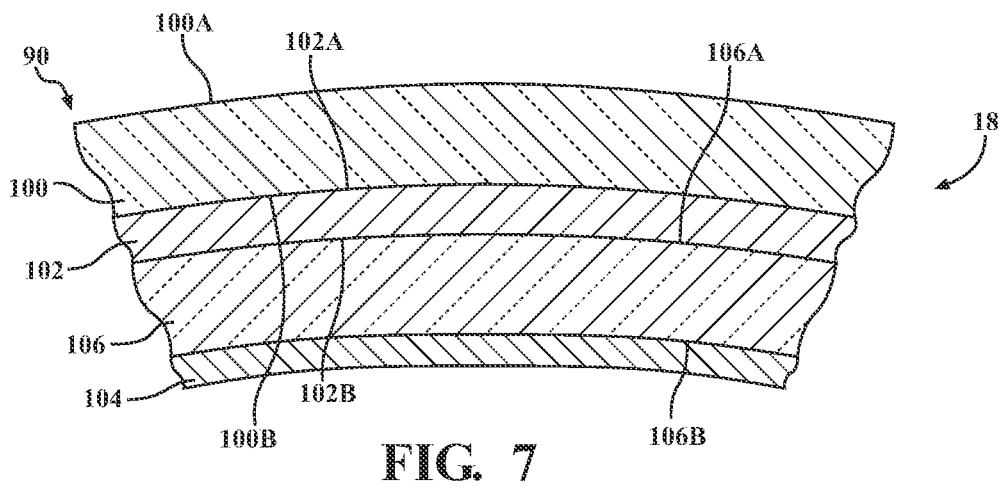
FIG. 7 is a cross-sectional schematic view of the window assembly of FIG. 1 taken along line 7-7 including a laminated window assembly having a conductive ink applied thereto in accordance with another exemplary embodiment.

In FIG. 7, in another embodiment, the conductive ink 104 is applied to the inwardly facing surface 106B of the inner transparent substrate 106 and thus the inner transparent substrate 106 is disposed between the interlayer 102 and the conductive ink 104.

In still further embodiments, as opposed to being applied to one of the outwardly or inwardly facing surfaces 100A, 106A, 100B and 106B (i.e., one of P1, P2, P3 or P4) of the respective inner and outer transparent substrates 106, 100 of the laminated window assembly 90, the conductive ink 104 can be applied to more than one of the outwardly or inwardly facing surfaces, 100A, 106A, 100B and 106B of the respective inner and outer transparent substrates 106, 100 of the laminated window assembly 90. For example, the conductive ink 104 can be applied to both of the surfaces 100A, 100B of the outer transparent substrate 100 (i.e., to both P1 and P2); to both of the surfaces 106A, 106B of the inner transparent substrate 106 (i.e., to both P3 and P4); to both of the outwardly facing surfaces 106A, 100A (i.e., P1 and P4) of the respective inner and outer transparent substrates 106, 100 of the laminated window assembly 90; or to both of the inwardly facing surfaces 106B, 100B (i.e., P2 and P3) of the respective inner and outer transparent substrates 106, 100 of the laminated window assembly 90.

In certain embodiments, the composition of the conductive ink 52, 104 of any one applied layer is the same, or different, as the composition of any other applied layer of the conductive ink 52, 104 and may vary in composition based upon a variety of factors including the method of application or location.

In certain embodiments, the composition of the conductive ink 52 prior to application includes a binder, a pigment, and solvents such as water and, in certain embodiments, optionally another solvent such as an organic solvent. In these embodiments, one or both of the binder and pigment may provide the applied conductive ink 52 with the desired level of conductivity. In embodiments in which the applied conductive ink 52 is photocured, the binder material includes organic monomers/oligomers which are photocurable, such as acrylic monomers and/or oligomers and mixtures thereof. Exemplary pigments that may be used include conductive pigments such as carbon black, for example C.I. Black 7 carbon black. Other pigments may be included that provide the applied conductive ink 52 with a desired color appearance, such as various other non-conductive black pigments used in conjunction with the conductive pigments described above.

The conductive ink 52, 104 may be applied to the curved transparent substrate using analog printing processes such as screen-printing, spray-printing with a mask, and the like. For example, to screen print the conductive ink 52, 104, a mask (i.e., a "screen") defining voids corresponding to a desired area to be printed is arranged over the transparent substrate 18. The conductive ink 52, 104 is deposited over the mask in a manual process, such as with a roller, squeegee, brush, spray, or the like to apply the conductive ink 52, 104 to the transparent substrate 18 in the desired pattern. Any method of applying the conductive ink 52, 104 is contemplated.

In certain embodiments, applying the conductive ink 52, 104 includes digitally-applying the conductive ink 52, 104 to the substrate 18. The term digitally-applying refers to any suitable application process where application of the conductive ink 52 is digitally controlled to deposit the conductive ink 52 on a substrate in accordance with a digital based image. Example processes for digitally-applying the conductive ink 52 include, but are not limited to, inkjet printing, electrohydrodynamic printing, laser printing, and the like. Notably, due to the precise control afforded by digitally-applying the conductive ink 52, the conductive ink 52 may be deposited at a significantly higher resolutions than analog printing processes. For example, the conductive ink 52 may be digitally applied onto a surface of the curved transparent substrate 18 at a resolution of greater than 200 dots per inch, greater than 300 dots per inch, greater than 400 dots per inch, greater than 500 dots per inch, greater than 600 dots per inch, greater than 700 dots per inch, greater than 800 dots per inch, greater than 900 dots per inch, greater than 1000 dots per inch, greater than 1100 dots per inch, greater than 1200 dots per inch, greater than 1300 dots per inch, greater than 1400 dots per inch, greater than 1500 dots per inch, greater than 1600 dots per inch, greater than 1700 dots per inch, greater than 1800 dots per inch, greater than 1900 dots per inch, greater than 2000 dots per inch, greater than 2100 dots per inch, greater than 2200 dots per inch, greater than 2300 dots per inch, greater than 2400 dots per inch, greater than 2500 dots per inch, or greater than 2600 dots per inch. It is notable that a mask is not required when digitally-applying the conductive ink 52, as is typically required for analog printing processes. Instead, the conductive ink 52 is deposited directly onto a surface of the curved transparent substrate 18 in accordance with a digital based image, eliminating the need for a mask.

In one example, digitally-applying the conductive ink 52 comprises inkjet-printing the conductive ink onto the surface of the curved transparent substrate 18. Generally, the term "inkjet-printing" refers to a printing process where a digitally controlled printhead propels droplets of ink onto a substrate in accordance with a digital based image. Examples of inkjet printing processes include, but are not limited to, continuous inkjet printing, thermal inkjet printing, piezo inkjet printing, drop-on-demand inkjet printing, and the like. Inkjet-printing the conductive ink 52 onto a surface of the curved transparent substrate 18 may be carried out at a resolution of greater than 200 dots per inch, greater than 300 dots per inch, greater than 400 dots per inch, greater than 500 dots per inch, greater than 600 dots per inch, greater than 700 dots per inch, greater than 800 dots per inch, greater than 900 dots per inch, greater than 1000 dots per inch, greater than 1100 dots per inch, greater than 1200 dots per inch, greater than 1300 dots per inch, greater than 1400 dots per inch, greater than 1500 dots per inch, greater than 1600 dots per inch, greater than 1700 dots per inch, greater than 1800 dots per inch, greater than 1900 dots per inch, greater than 2000 dots per inch, greater than 2100 dots per inch, greater than 2200 dots per inch, greater than 2300 dots per inch, greater than 2400 dots per inch, greater than 2500 dots per inch, or greater than 2600 dots per inch In another example, digitally-applying the conductive ink 52 comprises electro-hydrodynamically printing the conductive ink 52 onto the surface of the curved transparent substrate 18. Generally, the term "electrohydrodynamic printing" refers to a printing process where a digitally controlled and electrically charged printhead directs ink through a nozzle and onto a substrate in accordance with a digital based image. In some examples, the width of the nozzle may be as low as 10 micrometers such that the line width of the applied conductive ink 52 is likewise 10 micrometers. Of course, it should be appreciated that a width of the nozzle may be selected that is wider than 10 micrometers to form conductive features 16 having a wider line width W than 10 micrometers. Additionally, it is contemplated that electro-hydrodynamically printing the conductive ink 52 onto a surface of the curved transparent substrate 18 may be carried out at a resolution of greater than 200 dots per inch, greater than 300 dots per inch, greater than 400 dots per inch, greater than 500 dots per inch, greater than 600 dots per inch, greater than 700 dots per inch, greater than 800 dots per inch, greater than 900 dots per inch, greater than 1000 dots per inch, greater than 1100 dots per inch, greater than 1200 dots per inch, greater than 1300 dots per inch, greater than 1400 dots per inch, greater than 1500 dots per inch, greater than 1600 dots per inch, greater than 1700 dots per inch, greater than 1800 dots per inch, greater than 1900 dots per inch, greater than 2000 dots per inch, greater than 2100 dots per inch, greater than 2200 dots per inch, greater than 2300 dots per inch, greater than 2400 dots per inch, greater than 2500 dots per inch, or greater than 2600 dots per inch. In embodiments wherein the conductive ink 52, 104 is digitally applied such as through an inkjet printing process, the conductive ink 52, 104 may have a line width between 10 micrometers and 1 millimeter.

Notably, after digital application, the applied conductive ink 52 may spread out or disperse on the surface of the curved transparent substrate 18 before the applied conductive ink 52 is cured. For example, the conductive ink 52 may be digitally-applied at a resolution of 400 dots per inch; however, before curing, the conductive ink 52 that was digitally-applied at 400 dots per inch may spread out on the surface of the curved transparent substrate 18 such that, upon curing, the conductive feature 16 has a lower resolution of, for example, 200 dots per inch, than the resolution upon the initial digital application. Additionally, the curing process itself may affect the resolution of the conductive feature 16. For example, the conductive ink 52 may expand or contract during curing step, affecting the resolution of the conductive feature 16.

Accordingly, the resolution of the conductive ink 52 when digitally applied may differ from the resolution of the conductive feature 16 after curing the digitally applied conductive ink 52. Thus, upon curing the digitally applied conductive ink 52, the conductive feature 16 may have a resolution of greater than 200 dots per inch. Particularly, it is contemplated that the conductive feature may have a resolution of greater than 200 dots per inch, greater than 300 dots per inch, greater than 400 dots per inch, greater than 500 dots per inch, greater than 600 dots per inch, greater than 700 dots per inch, greater than 800 dots per inch, greater than 900 dots per inch, greater than 1000 dots per inch, greater than 1100 dots per inch, greater than 1200 dots per inch, greater than 1300 dots per inch, greater than 1400 dots per inch, greater than 1500 dots per inch, greater than 1600 dots per inch, greater than 1700 dots per inch, greater than 1800 dots per inch, greater than 1900 dots per inch, greater than 2000 dots per inch, greater than 2100 dots per inch, greater than 2200 dots per inch, greater than 2300 dots per inch, greater than 2400 dots per inch, greater than 2500 dots per inch, or greater than 2600 dots per inch.

Figure 8:
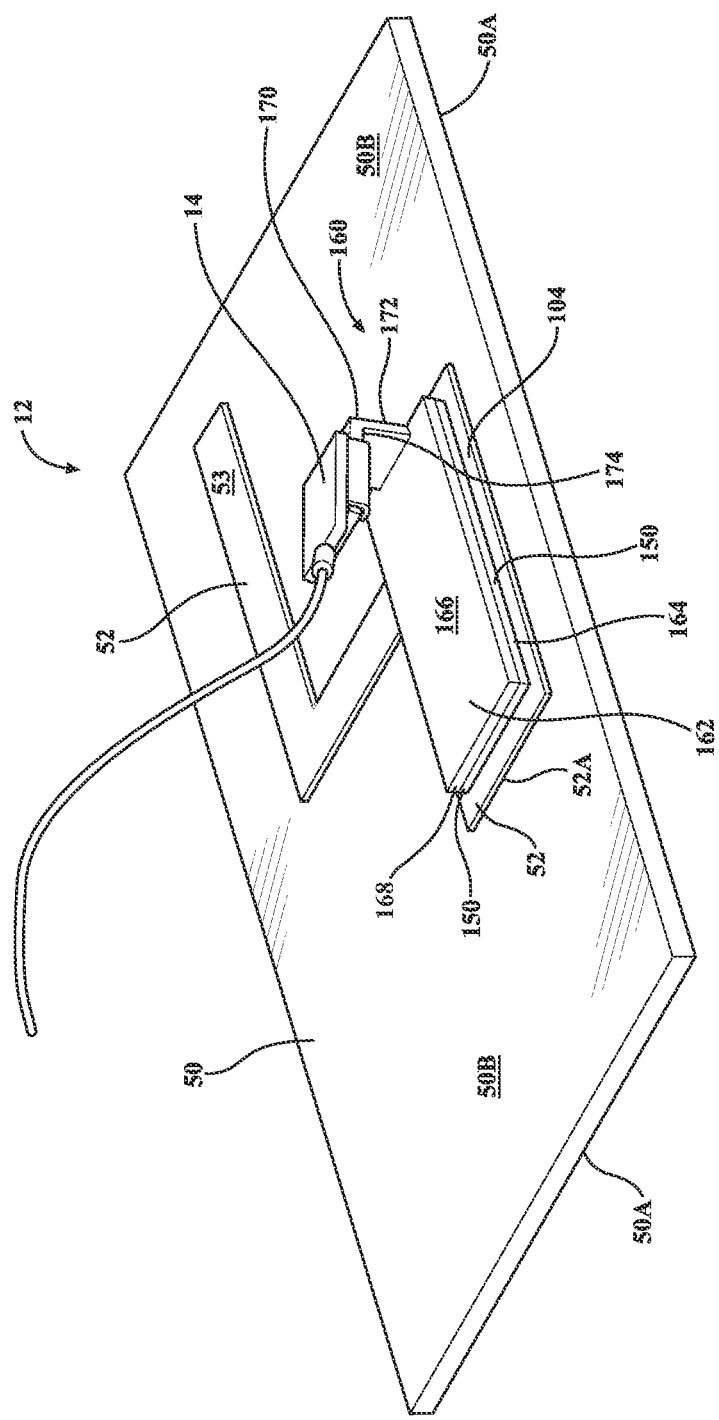
FIG. 8 is a perspective view of a portion of the window assembly of FIG. 3 having a conductive ink applied thereto and further including a solderless electrical connector electrically connected to the conductive ink in accordance with an exemplary embodiment.

FIGS. 8 and 11 generally illustrate embodiments of a solderless electrical connector 12 for electrically and mechanically coupling, or connecting, the wire harness 14 to the conductive feature 16. In certain embodiments, the solderless electrical connector 12 includes an adhesive 150 that mechanically connects the wire harness 14 to the conductive feature 16 disposed on the substrate 18. In certain embodiments, the adhesive 150 is conductive, and hence may also be referred to as a conductive adhesive 150 and the conductive adhesive 150 is part of the electrical connection that also electrically connects the wire harness 14 to the conductive feature 16 disposed on the substrate 18. In other embodiments, the adhesive 150 is non-conductive, and the non-conductive adhesive 150 is not part of the electrical connection that electrically connects the wire harness 14 to the conductive feature 16 disposed on the transparent substrate 18 but simply serves the mechanical connection of the wire harness 14 to the transparent substrate 18.

FIG. 8 illustrates the solderless electrical connector 12 in accordance with one exemplary embodiment used with the curved glass panel 50 having the conductive ink 52 applied to the inwardly facing surface 50B as in FIG. 2. Meanwhile, FIG. 11 illustrates the solderless electrical connector 12 in accordance with another exemplary embodiment used with the laminated window assembly 90 of FIG. 4 having the conductive ink 104 applied to the outwardly facing surface 106A of the inner transparent substrate 106.

In alternative embodiments, as illustrated in FIGS. 15 and 16, a solderless electrical connector 300 (see FIGS. 12-14) in accordance with another alternative embodiment is provided. FIG. 15 illustrates the solderless electrical connector 300 used with the curved glass panel 50 having the conductive ink 52 applied to the inwardly facing surface 50B as in FIG. 2. Meanwhile, while FIG. 16 illustrates the solderless electrical connector 300 used on the laminated window assembly 90 of FIG. 5 having the conductive ink 104 applied to the inwardly facing surface 100B of the outer transparent substrate 100.

While the illustrations in FIGS. 8, 11, 15 and 16 show flat transparent substrates 18, these substrates 18 are illustrated as flat for ease of illustration only. In fact, the glass panel 50 in FIGS. 8 and 15, and the substrates 100, 102, and 106 in FIGS. 11 and 16, are curved substrates/panels corresponding to those illustrated in FIGS. 2-7 as shown and as described above even though they are depicted as flat.

Referring first to FIGS. 8 and 11, the solderless electrical connector 12, according to certain exemplary embodiments, includes the adhesive 150 that is used to mechanically connect the wire harness 14 to the conductive ink 52, 104 applied to the single plane of glass 50 or to the outer or inner substrates 100, 106 of the laminated window assembly 90.

In certain embodiments, the chosen adhesive 150 is electrically conductive to transfer electrical energy from the wire harness 14 to the conductive feature 16, and hence is a conductive adhesive. Accordingly, the conductive adhesive 150 functions to mechanically and electrically connect the wire harness 14 to the conductive ink 52, 104 applied to the single plane of glass 50 or to the outer or inner substrates 100, 106 of the laminated window assembly 90.

In addition, the adhesive 150 applied to the transparent substrate 18 and/or to the applied conductive ink 52, 104, is cured at a temperature below the thermal degradation temperature of the applied conductive ink 52, 104. This is desirable to prevent the loss of electrical conductivity along a portion or all of the conductive feature 16, and in particular within the applied conductive ink 52, 104. This curing may be via a photocuring process, or via a thermal curing process, or through a combination thereof.

In certain embodiments, the adhesive 150 has a green strength (i.e., the initial contact bonding strength) that is sufficient to maintain the solderless electrical connector 12 in a sealing and bonded state with the transparent substrate 18 and/or with the conductive ink 52, 104, applied to the transparent substrate 18 during use without the need for external fixturing during the curing process.

As also illustrated in FIGS. 8 and 11, in certain exemplary embodiments, the solderless electrical connector 12 also includes a terminal assembly 160 that is used as the electrical connection attachment point for the wire harness 14, thus electrically connecting the wire harness 14 to the conductive ink 52, 104 through the solderless electrical connector 12.

The terminal assembly 160 includes a base plate portion 162 having a lower surface 164 and an upper surface 166 and an outer peripheral edge 168 that connects the lower surface 164 to the upper surface 166, The lower surface 164 is disposed onto, and is in contact with, the adhesive 150. The terminal assembly 160 also includes a flange portion 170 coupled to and extending from a portion of the outer peripheral edge 168. In FIGS. 8 and 11, the flange portion 170 is L-shaped, and includes a first portion 172 extending transverse to the upper surface 166 and a second portion 174 extending transverse to the first portion 172. In the embodiments of FIGS. 8 and 11, the second portion 174 provides the electrical coupling point for the wire harness 14 (shown disconnected from the second portion 174 in FIGS. 8 and 11).

In certain embodiments, both the base plate portion 162 and the flange portion 170 are formed from an electrically conductive material, such as a metal or metal alloy, and thus an electrical connection is formed between the wire harness 14 and the conductive ink 52, 104 through the flange portion 170 and base plate portion 162 of the solderless electrical connector 12 when the wire harness 14 is coupled to the flange portion 170. In some examples, the base plate portion 162 and flange portion 170 are integrally formed, but may be formed as two separate components that are affixed and electrically connected (when each of the base plate portion 162 and flange portion 170 are formed from electrically conductive materials) to each other to form an integral structure.

In alternative embodiments, the base plate portion 162 is formed from a non-conductive material, or insulator material, such as a non-conductive polymeric material, and the flange portion 170 is formed from the conductive material as described above. The polymeric material, in certain embodiments, may be a durable plastic material such as nylon. In these embodiments, the flange portion 170 may be coupled to the base plate portion 162 through a molding operation, such as injection molding or the like, to form an integral structure. To provide the electrical connection, the lower surface of the first portion 172 of the flange portion 170 is positioned such that the first portion 172 is in electrical contact with the adhesive 150 which is in electrical contact with the conductive ink 52, 104, in embodiments wherein the adhesive 150 is a conductive adhesive, or is in contact with the transparent substrate 18 which is in electrical contact with the conductive ink 52, 104.

In each of the embodiments of FIGS. 8 and 11 that include a conductive adhesive 150, the conductive adhesive 150 is applied to an outer surface 53, 105 of the conductive ink 52, 104 opposite a surface 50B, 106B of the glass panel 50, 106 to which the conductive ink 52, 104 is applied. Otherwise, when a non-conductive adhesive 150 is utilized, the non-conductive adhesive 150 may be applied directly to glass panel 50, 106 adjacent to or otherwise in proximity to the outer surface 53, 105 of the conductive ink 52, 104 of the glass panel 50, 106.

In particular, in the representative embodiment of FIG. 8 that includes a conductive adhesive 150, the conductive adhesive 150 is applied to the outer surface 53 of the conductive ink 52 opposite the inwardly facing surface 50B of the single pane of glass 50. As illustrated in FIG. 8, the conductive ink 52 is applied to the inwardly facing surface 50B according to the embodiment described above in FIG. 2; however, in alternative embodiments, the conductive ink 52 could be applied to the outwardly facing surface 50A according to the embodiment described above in FIG. 3, or to both the inwardly facing surface 50B and the outwardly facing surface 50A.

In the representative embodiment of FIG. 11 that includes a conductive adhesive 150, the conductive adhesive 150 is applied to the outer surface 105 of the conductive ink 104 opposite the outwardly facing surface 106A of the inner substrate 106 according to the embodiment described above in FIG. 4.

More particularly, to apply the conductive adhesive 150 to the outer surface 105 of the conductive ink 104 opposite the outwardly facing surface 106A of the inner substrate 106 according to the embodiment described above in FIG. 5, it is desirable to have access to the conductive ink 104 without having to cut or otherwise remove sections of the outward transparent substrate 100 and interlayer 102 for such application.

Figure 9:
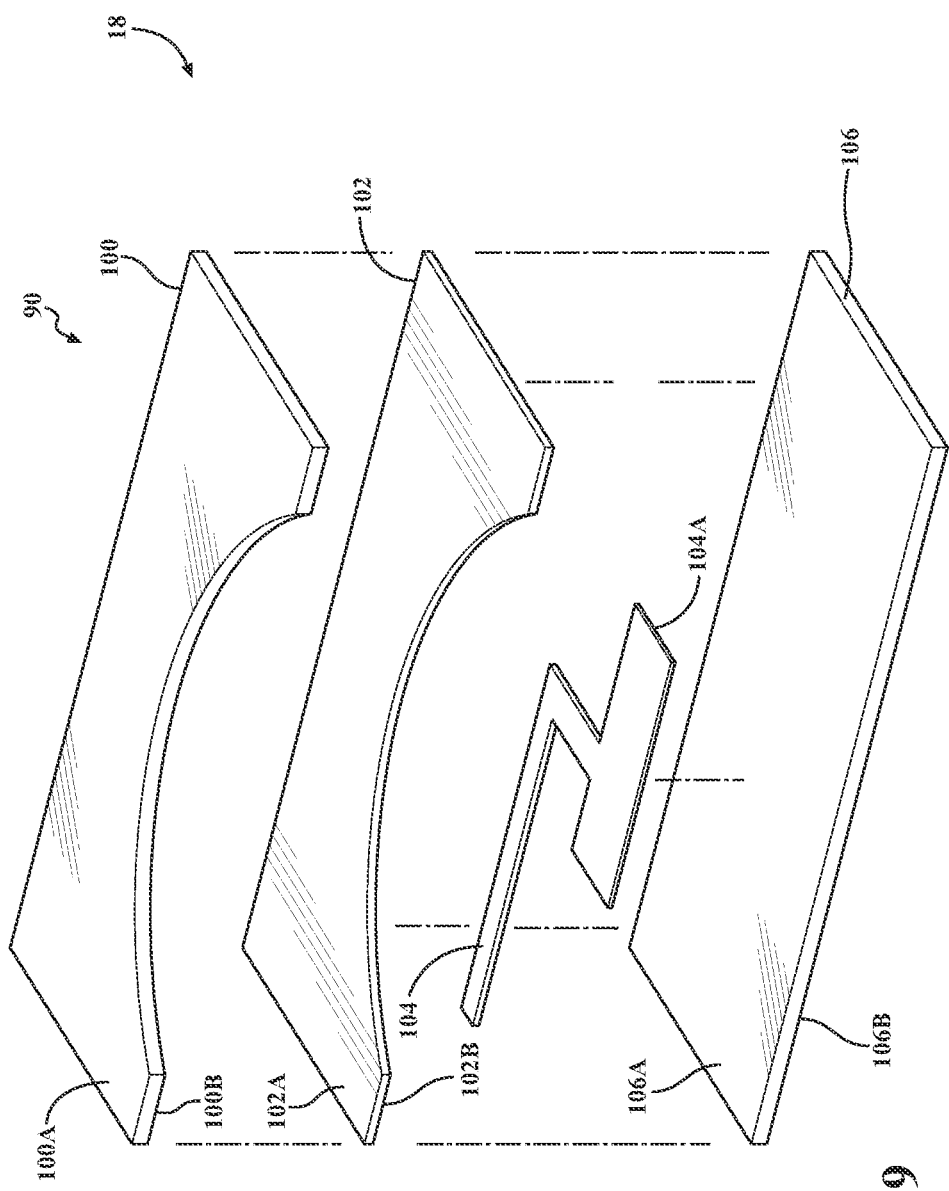
FIG. 9 is an exploded view of a portion of the laminated window assembly of FIG. 4 in which the outer transparent substrate and an interlayer are scalloped to reveal an inwardly facing surface of the inner transparent substrate having a conductive ink applied thereto in accordance with another exemplary embodiment.

Accordingly, as best shown in FIGS. 9 and 10 as it relates to FIG. 11, the outer transparent substrate 100 and interlayer 102 of the laminated window assembly 90 are scalloped (i.e., wherein an edge of each of the outer transparent substrate 100 and interlayer 102 includes scalloped edge regions 100C, 102C) during their respective formation process to reveal the inwardly facing surface 106B of a portion of the outer substrate 100 of having the conductive ink 104. Preferably, this scalloping takes place during the initial formation of the outer transparent substrate 100 and interlayer 102.

While laminated window assembly 90 is assembled via a lamination method, as shown in FIG. 10, the scalloped edge regions 100C, 102C are aligned to form a coextensive scalloped edge 107, with a portion of the outwardly facing surface 106A of the inner substrate 106 and a portion of the conductive ink 104 uncovered and available for application of the conductive adhesive 150 thereto corresponding to the area removed by the scalloping.

In the embodiments illustrated, the scalloped edge regions 100C, 102C are located along the outer periphery of the laminated window assembly 90. However, in other embodiments, the scalloped edge regions 100C, 102C may be internal relative to the respective outer substrate 100 and interlayer 102, and hence the scalloped edge regions 100C, 102C define an opening surrounded by the respective outer substrate 100 and interlayer 102.

In certain embodiments, the conductive adhesive 150 may also be applied onto a peripheral edge portion 52A. 104A of the conductive ink 52, 104 and onto the surface 50A, 106A of the curved transparent substrate 18 adjacent to peripheral edge portion 52A. 104A of the conductive ink 52, 104. Thus, the conductive adhesive 150 may form a peripheral seal adjacent to the peripheral edge portion 52A. 104A of the conductive ink 52, 104.

After application of the conductive adhesive 150, the lower surface 164 of the base plate portion 162 is disposed onto, and in contact with, the conductive adhesive 150 opposite the transparent substrate 18.

Next, the conductive adhesive 150 is cured to affix the base plate portion 162 to the conductive ink 52, 104 and optionally to the transparent substrate 18 (in embodiments where the thermal conductive adhesive 150 is applied onto the surface 50A, 106A of the curved transparent substrate 18 adjacent to peripheral edge portion 52A, 104A of the conductive ink 52, 104, as described above).

In exemplary embodiments, as noted above, the adhesive 150 is cured at a temperature below the thermal degradation temperature of the applied conductive ink 52, 104. This is desirable so as to prevent the loss of electrical conductivity along a portion or all of the applied conductive ink 52, 104 of the conductive feature 16.

In certain embodiments, the adhesive 150 is photocured at a temperature below the thermal degradation temperature of the conductive ink 52, 104. In certain other embodiments, the adhesive 150 is thermally cured at a temperature below the thermal degradation temperature of the applied conductive ink 52, 104. In still further embodiments, the applied adhesive 150 is both photocured and thermally cured at a temperature below the thermal degradation temperature of the conductive ink 52, 104.

Exemplary conductive adhesives 150 that can be used include, but are not limited to, acrylate polymers, epoxy polymers, or acrylate and epoxy copolymers, or a polyurethane adhesive. The conductive adhesive 150 may be a reactive adhesive (i.e., an adhesive that initiates curing in response to an outside stimulus such as exposure to light, heat, moisture, or other initiating chemicals). In some examples, the conductive adhesive 150 may include a photoinitiator that initiates polymerization of the adhesive in response to exposure to UV light. The electrical conductivity of these conductive adhesives 150 may be provided by the polymer itself (i.e., an intrinsically conductive polymer) or by a conductive filler, such as a metal or carbon filler (powder or fiber), disbursed through the polymer In alternative embodiments to FIG. 11, the adhesive 150 is applied to outer surface 105 of the applied conductive ink 104, which is applied in accordance with the embodiments of the laminated window assembly 90 illustrated in FIGS. 5, 6 and 7, respectively.

In the embodiment of FIG. 5, the same procedure is generally followed as to that in FIG. 11, with the exception that the inner transparent substrate 106 (as opposed to the outer transparent substrate 100) and the interlayer 102 are scalloped, and that the adhesive 150 is applied to the outer surface 105 of the conductive ink 104 which had previously been applied to the inwardly facing surface 100B of the outer transparent substrate 100.

For the embodiments of FIGS. 6 and 7, the same general procedure is followed as in FIG. 8, wherein none of the inner or outer transparent substrates 100, 106 are scalloped (along with the interlayer 102), but instead the adhesive 150 is applied to the outer surface 105 of the conductive ink 104 which had previously been applied to the outwardly facing surface 100A of the outer transparent substrate 100 (as in FIG. 6) or has been applied to the inwardly facing surface 106B on the inner transparent substrate 106.

Referring now to FIGS. 12-18, and as opposed to utilizing an adhesive 150 and a terminal assembly 160 as the solderless electrical connector 12 to electrically couple the conductive ink 52 to the wire harness 14 as in FIGS. 8 and 11, an alternative solderless connector 300 may be utilized.

Referring first to FIGS. 12-16, the solderless electrical connector 300 according to alternative embodiments includes, as major components, an insulating cover 302, a biasing member 320, and an adhesive 350 for adhering the cover 302 to the transparent substrate 18.

The insulating cover 302 may be formed from a durable polymeric material such as nylon and is generally in the form of a plate that is defined within an inner surface 306, and outer surface 308, and an edge surface 310, with the edge surface 310 extending between and connecting the inner surface 306 to the outer surface 308.

The biasing member 320 may be in the form of a pair of spaced apart leaf springs 320. Each biasing member/leaf spring 320 includes a first end 322 and an opposing second end 324 and a central region 326 coupling and extending between the first end 322 and second end 324. The second end 324 of each biasing member/leaf spring 320 defines an opening 328 that is used as the coupling point for the wires of the wire harness 14. The biasing member/leaf springs 320 are formed from a conductive material, such as a metal or metal alloy that permits electricity to flow from the wire harness 14 to the applied conductive ink 52, 104 when the solderless connector 300 is assembled and coupled to the transparent substrate 18 and the wire harness 14 is connected to the biasing member 320 in the assembled state as described further below.

The second end 324 of each of the biasing member/leaf springs 320, as shown in the embodiments of FIGS. 12-16, may be curved along its length and extend outwardly and transversely away from the outer surface 308 of the insulating cover, such that the terminal ends 324a of the respective second ends 324 of the biasing member/leaf springs 320 are spaced furthest from the outer surface 308 of the insulating cover 302. In some examples, the terminal ends 324a of the respective second ends 324 are positioned closer to each other than the remainder of the length of the respective second ends 324 relative to each other (such as the portions of the second ends 324 adjacent to the central region 326). In further alternative embodiments, the second end 324 may extend generally perpendicular to the outer surface 308 along its length between the central region and the respective terminal end 324a, with the terminal ends 324a spaced furthest from the outer surface 308 of the insulating cover 302.

The first end 322 of each of the biasing member/leaf springs 320, as shown in the embodiments of FIGS. 12-16, may be straight or curved along its length and extend outwardly and transversely away from the inner surface of the insulating cover 302 such that the terminal ends 322a of the respective second ends 322 of the biasing member/leaf springs 320 are spaced furthest from the inner surface 306 of the insulating cover 302. Preferably, and as shown in the FIGS., the terminal ends 322a of the respective first ends 322 are positioned closer to each other than the remainder of the length of the respective first ends 322 relative to each other (such as the portions of the first ends 322 adjacent to the central region 326).

In certain embodiments, the terminal ends 322a are curved relative to the rest of the length of the first ends 322 so as to provide additional surface area for coupling to the transparent substrate 18.

In still further embodiments, such as shown in FIG. 15, the first end 322 of the biasing member/leaf spring 320 includes a step portion 323 adjacent to the central portion 326. This step portion 323 allows an additional length of the first end 322 of the biasing member/leaf spring 320 to be placed into contact with the inner surface 306 of the insulating cover 302 when the insulating cover 302 is coupled to the pane of glass 50 as a part of forming the solderless electrical connector 300.

The biasing member/leaf spring(s) 320 used in any of FIGS. 12-16 may be molded within, or otherwise coupled to, the molded insulating cover 302 such that central region 326 extends through and is affixed to the insulating cover 302 with the first end 322 extending outwardly away from the inner surface 306 and with the second end 324 extending outwardly away from the outer surface 308.

In certain embodiments, the biasing member/leaf spring(s) 320 are in the form of a metal (such as aluminum) or metal alloy (such as an aluminum alloy) and/or a polymeric material and/or an elastomeric material that resists taking a compression set over time and maintains some degree of functional elasticity over time at temperatures ranging from about minus 40 degrees Celsius to about 120 degrees Celsius.

In other alternative embodiments, the polymeric material of the biasing member/leaf spring(s) 320 may comprise a foam, such as an open-cell or closed-cell foam. In certain embodiments, the polymeric and/or elastomeric material of the biasing member/leaf spring(s) 320 may comprise, for example, a polyurethane, a rubber (such as a rubber formed from ethylene propylene diene monomer (EPDM)), or polystyrene.

To facilitate connection with the conductive feature 16, the biasing member/leaf spring(s) 320 may be electrically conductive. The electrical conductivity may be provided by the polymer itself (i.e., an intrinsically conductive polymer), by a conductive filler, such as a metal or carbon filler (powder or fiber) disbursed through the polymer, and/or through the use of a conductive skin, such as a metal or metal alloy foil, disposed on the polymer.

In yet still further embodiments, such as shown in FIG. 16, the central region 326 of the biasing member/leaf spring 320 defines a pair of cutout regions 327 along its length. These cutout regions 327 function to increase the pull strength of the biasing member/leaf spring 320 molded within the cover 302 during use. The cutout regions 327 may define any suitable geometry and in some examples may be opposing.

The adhesive 350 may be applied to the inner surface 306 of the insulating cover 302 adjacent to the intersection 309 of the inner surface 306 and edge surface 308. In addition, the adhesive 350 may also be applied to the inner surface 306 in areas not associated with the second end 324 of the biasing member/leaf spring(s) 320.

In certain embodiments, the adhesive 350 is in the form a tape (i.e., an adhesive tape) that is adhered to the inner surface 306. In certain embodiments, the adhesive 350 utilized in the tape 350 is non-conductive, while in other embodiments the adhesive 350 and/or the tape adhesive 350 may be an adhesive similar to the adhesive 150 described above with respect to FIGS. 8-11. Prior to being applied to the inner surface, the tape adhesive 350 may include a carrier layer (i.e., a liner) that is removed prior to the tape adhesive 350 being applied to the inner surface 306. A separate opposing carrier layer may also be provided that is subsequently removed prior to the tape adhesive 350 being applied to the transparent substrate 18, as described below.

In some embodiments, the chosen adhesive 350 should have a green strength (i.e., the initial contact bonding strength) that is sufficient to maintain the insulating cover 302 against the inner surface 306 of the insulating cover 302, and subsequently to the surface of the transparent substrate 18 in a sealing and bonded state during use without the need for external fixturing during the curing process, if utilized.

Exemplary adhesives 350 that can be used include, but are not limited to, acrylate polymers, epoxy polymers, acrylate and epoxy copolymers, and polyurethane adhesives. The adhesive 350 may be a reactive adhesive (i.e., an adhesive that initiates curing in response to an outside stimulus such as exposure to light, heat, moisture, or other initiating chemicals). In some examples, the adhesive 350 may include a photoinitiator that initiates polymerization of the adhesive in response to exposure to UV light. One exemplary tape adhesive based on an acrylate and epoxy copolymer is Structural Bonding Tape 9550, commercially available from 3M™ of St. Paul, Minnesota. Another exemplary tape adhesive based on epoxy resin chemistry is UV-LUX®, commercially available from Lohmann GmbH & Co. KG of Neuwied, Germany.

In certain embodiments, the adhesive tape 350 is a solid state pressure sensitive adhesive (PSA) tape 350 that can be adhered to the transparent substrate 18, 100 by applying pressure to the tape 350 to remove air bubbles between the tape 350 and the transparent substrate 18, 100 to ensure intimate contact between the tape 350 and the transparent substrate 18, 100. In certain embodiments, the pressure applied to the PSA tape 350 initiates the curing process within the PSA tape 350, with the curing occurring at temperatures below the thermal degradation temperature of the conductive ink 104 as described above. In still further embodiments, the PSA tape can be photocured and/or thermally cured in addition to utilizing pressure to initiate the curing process within the PSA tape 350, with the curing occurring at temperatures below the thermal degradation temperature of the conductive ink 104 as described above.

In certain embodiments, the adhesive 350 is electrically conductive, and is an electrically conductive adhesive 350. The electrical conductivity of the electrically conductive adhesives 350 may be provided by the polymer itself (i.e., an intrinsically conductive polymer) or by a conductive filler, such as a metal or carbon filler (powder or fiber), disbursed through the polymer.

In the assembled state as best shown in two exemplary embodiments in FIGS. 17 and 18 (and as described in further detail below), the first end 322 is positioned into electrical contact with the conductive ink 104 and is elastically compressed between the molded insulating cover 302 and the conductive ink 104. In embodiments wherein the adhesive 350 is in the form of a tape, any carrier layer is removed from the tape adhesive 350, and then a photocuring of the tape adhesive is initiated, after which the tape adhesive 350 is pressed onto the transparent substrate 18 or onto the outer surface 53, 105 of the applied conductive ink 52, 104 to adhere the insulative cover 302 to the transparent substrate 18 directly, or to transparent substrate 18 indirectly through the conductive ink 52, 104 such that the first end 322 of the biasing member/leaf spring(s) 320 is also sealingly disposed between the adhesive 350, the inner surface 306 of the insulative cover 302, and the top surface of the applied conductive ink 52, 104. If the adhesive 350 is not in the form of a tape, no carrier removal step is necessary, and the adhesive 350 is instead applied onto the transparent substrate 18 or onto the outer surface 53, 105 of the applied conductive ink 52, 104 to adhere the insulative cover 302 to the transparent substrate 18 directly, or to transparent substrate 18 indirectly through the conductive ink 52, 104 such that the first end 322 of the biasing member/leaf spring(s)

320 is also sealingly disposed between the adhesive 350, the inner surface 306 of the insulative cover 302, and the top surface of the conductive ink 52, 104. In addition, the second end 324 of the biasing member/leaf spring(s) 320 extends outwardly from the outer surface 308 of the insulative cover 302 in a direction away from the transparent substrate 18 and conductive ink 52, 104 and is configured for coupling with the wires of the wire harness 14 via the opening 328 at the second end 324.

FIGS. 15 and 16 generally illustrate embodiments of the solderless electrical connector 300 mechanically and electrically connecting the wire harness 14 to the conductive feature 16 disposed on the transparent substrate 18 and in the assembled state. FIG. 15 illustrates the solderless electrical connector 300 used with the curved glass panel 50 having the conductive ink 52 applied to the inwardly facing surface 50B as in FIG. 2, while FIG. 16 illustrates the solderless electrical connector 12 used on the laminated window assembly 90 of FIG. 5 having the conductive ink 104 applied to the inwardly facing surface 100B of the outer transparent substrate 100.

Similar to the description above with respect to FIG. 8 as it relates to FIG. 15, the subject disclosure also contemplates alternative embodiments where the solderless electrical connector 300 is used with the curved glass panel 50 having the conductive ink 104 applied to the outwardly facing surface 50A according to the embodiment illustrated in FIG. 3, or to both the outwardly facing surface 50A and inwardly facing surface 50B.

Even further, and similar to the description above with respect to FIG. 11 as it relates to FIG. 16, the subject disclosure also contemplates alternative embodiments where the solderless electrical connector 300 is used in which the conductive ink 104 is applied in accordance with the embodiments of the laminated window assembly 90 illustrated in FIGS. 5, 6 and 7, respectively.

In an embodiment where the inner transparent substrate 106 (as opposed to the outer transparent substrate 100) and the interlayer 102 are scalloped, and where the conductive ink 104 had previously been applied to the inwardly facing surface 100B of the outer transparent substrate 100, the solderless electrical connector 300 is introduced by substantially the same procedure as discussed above as in FIG. 16.

In the alternative embodiments where neither of the inner or outer transparent substrates 100, 106 are scalloped (along with the interlayer 102), but instead where the conductive ink 104 has been previously been applied to the outwardly facing surface 100A of the outer transparent substrate 100 (as in FIG. 6) or has been applied to the inwardly facing surface 106B on the inner transparent substrate 106, the solderless electrical connector 300 is introduced by substantially the same procedure as discussed above as in FIG. 15 with respect to the single pane of glass 50.

Figure 19:
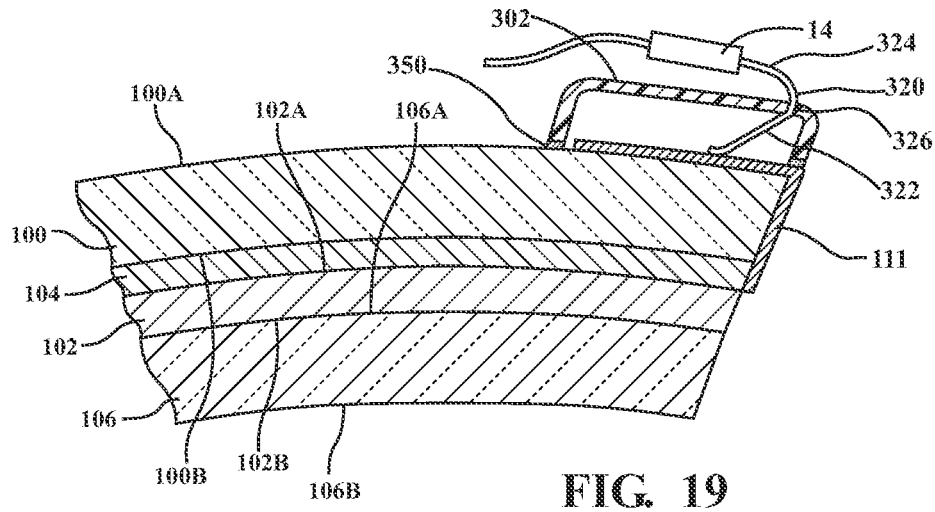
FIG. 19 is a cross-sectional schematic view of a portion of the laminated window assembly of FIG. 5 and further including a solderless electrical connector electrically connected to a respective electrical connection component and to the conductive ink applied to the inner surface of the inner transparent substrate.

Referring next to FIG. 19, yet another alternative embodiment of the laminated window assembly 90 including the solderless electrical connector 300 of FIG. 17 is shown. In this embodiment, a conductive foil 111 (i.e., a conductive ribbon 111) is utilized to form an electrical connection to the conductive ink layer 104 applied to the inwardly facing surface 100B (P2) of the outer transparent substrate 100 and/or to the inwardly facing surface 106A of the inner transparent substrate 106. In this embodiment, the electrical connection component 14 is disposed outwardly of either the outer transparent substrate 100 or inwardly of the inner transparent substrate 106 and does not require the scalloped arrangement such as in FIG. 18.

For ease of description and illustration, the conductive ink 104 in the embodiment of FIG. 19 has been applied to the inwardly facing surface 100B (i.e., P2) of the outer transparent substrate 100 and is thus disposed between the outer transparent substrate 100 and the interlayer 102.

Referring to FIG. 19, a conductive foil 111, here illustrated as aluminum foil 111, is electrically coupled or connected, and in certain embodiments physically connected, to the conductive ink 104 at its outer edge. The conductive foil 111 extends along the edge of the outwardly facing surface 100A of the outer substrate 100 (i.e., along P1) and is coupled with the solderless electrical connector 300 that includes the insulating cover 302, biasing member 320, and adhesive 350 as follows.

In the assembled state as also shown in FIG. 19, the first end 322 of the biasing member 320 is positioned into electrical contact with conductive foil 111 extending along the outwardly facing surface 100A of the outer substrate 100 and is elastically compressed between the molded insulating cover 302 and the conductive foil 111. In embodiments where the adhesive 350 is in the form of a tape, any carrier layer is removed from the tape adhesive 350, and then a photocuring of the tape adhesive 350 is initiated, after which the tape adhesive 350 is pressed onto the outwardly facing surface 100A and optionally along a top surface of the conductive foil 111 to adhere the insulative cover 302 to the outwardly facing surface 100A of the substrate 100 directly, and/or to the outwardly facing surface 100A of the substrate 100 indirectly through the conductive foil 111 such that the first end 322 of the biasing member/leaf spring(s) 320 is also sealingly disposed between the adhesive 350, the inner surface 306 of the insulative cover 302, and the top surface of the conductive foil 111. If the adhesive 350 is not in the form of a tape, no carrier removal step is necessary. In addition, the second end 324 of the biasing member/leaf spring(s) 320 extends outwardly from the outer surface 308 of the insulative cover 302 in a direction away from the outwardly facing surface 100A of the substrate 100 and conductive foil 111 and is configured for coupling with the wires of the wire harness 14 via the opening 328 at the second end 324 in the same manner described above in FIG. 17. Accordingly, electrical energizing of the conductive ink 104 on P2 (or P3 in alternative embodiments wherein the conductive ink 104 is applied onto the inwardly facing surface 106A such as in FIG. 4) occurs by actuation of the electrical connection component 14 with the charge extending through the conductive foil to the conductive ink 104.

As noted above, the present disclosure is also directed to associated methods of manufacturing a glass assembly having a solderless electrical connector 12 utilizing an adhesive 150 and a terminal assembly 160 with either the single pane of glass 50 (see the flowchart of FIG. 20 corresponding to FIG. 8) or with the laminated window assembly 90 (see the flowchart of FIG. 21 corresponding to FIG. 11) and with the use of an adhesive 150 in accordance with certain exemplary embodiments as described above. The present disclosure is also directed to associated methods for manufacturing a glass assembly having an alternative solderless electrical connector 300 on either on the single pane of glass 50 or with the laminated window assembly 90 (see the flowchart of FIGS. 21 and 22 which corresponds to FIGS. 15 and 16).

Figure 20:
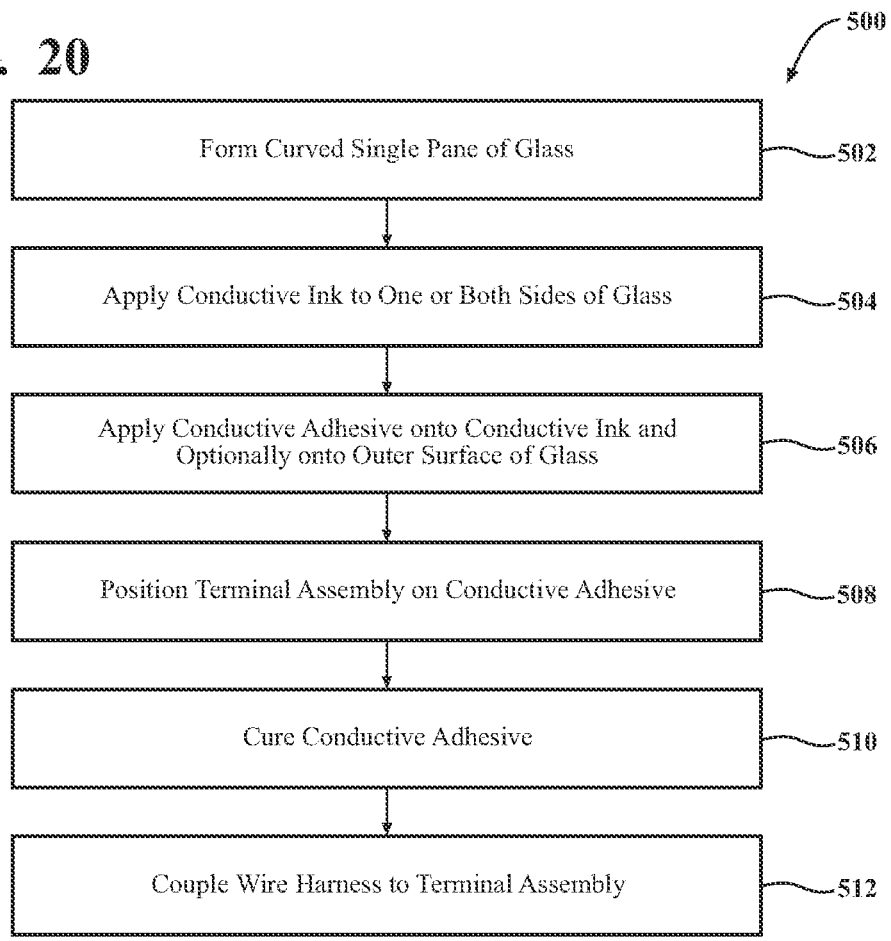
FIG. 20 is a flowchart illustrating a method of manufacturing a glass assembly having a solderless electrical connector in accordance with an exemplary embodiment.

Referring to FIG. 20, one exemplary embodiment of a method 500 for forming the glass assembly 10 with the solderless electrical connector 12 on a single pane of glass 50 is provided. For ease of description, the flowchart of FIG. 20 is described with respect to the embodiment of FIG. 8, in which the solderless electrical connector 12 is disposed on the inwardly facing surface 50B of the single pane of glass 50. However, the same procedure can be utilized in which the solderless electrical connector 12 is disposed on the outwardly facing surface 50A of the single pane of glass 50 in accordance with the flowchart of FIG. 20, with the slight differences in the procedure described in Step 504 below.

Referring first to Step 502, the curved transparent substrate 18 is formed as a single pane of glass 50 having the inwardly facing surface 50B and outwardly facing surface 50A, as described above.

Next, in Step 504, the conductive ink 52 is applied to one or both of the inwardly facing surface 50B and outwardly facing surface 50A (shown in FIG. 8 as being applied to the inwardly facing surface 50B as in FIG. 2). Suitable methods of applying the conductive ink 52 are described above. In certain embodiments, as a part of Step 504 and after application of the conductive ink 52, the conductive ink 52 is photocured, thermally cured, sintered, or otherwise dried onto the curved glass substrate 50, as described above.

In Step 506, the adhesive 150 is applied onto a portion of the conductive ink 52 and optionally onto the surface of the curved transparent substrate 18 adjacent to the conductive ink 52 (i.e., onto a portion of the inwardly facing surface 50B adjacent to the edge of the conductive ink 52).

In Step 508, the terminal assembly 160 is positioned onto the adhesive 150 opposite the conductive ink 52. In particular, the lower surface 164 of the base plate portion 162 is disposed onto, and is in contact with, the upper surface of the adhesive 150. More in particular, the lower surface 164 of the base plate portion 162 is pressed into the upper surface of the adhesive 150.

In embodiments where the base plate portion 162 is formed from a non-conductive material, the second portion 174 of the flange portion 170 is also brought into contact with the upper surface of the adhesive 150 during Step 508. In still further alternative embodiments, where the base plate portion 162 is formed from an electrically conductive material, the second portion 174 of the flange portion 170 is also brought into contact with the upper surface of the adhesive 150 during Step 508.

In embodiments where the base plate portion 162 and flange portion 170 are separate components, Step 508 may also include the substep where the base plate portion 162 and flange portion 170 are affixed to each other to form an integral structure prior to, or after, being disposed onto the adhesive.

Next, in Step 510, the adhesive 150 is cured to form the solderless electrical connector 12. In Step 510, the curing the adhesive 150 is cured at a temperature below the thermal degradation temperature of the applied conductive ink 52. This is desirable so as to prevent the loss of electrical conductivity along a portion or all of the applied conductive ink 52 and hence the conductive feature 16 resulting from the degradation of the applied conductive ink 52 if exposed to temperatures above its thermal degradation temperature.

In certain embodiments, the adhesive 150 is photocured at a temperature below the thermal degradation temperature of the applied conductive ink 52. In certain other embodiments, the adhesive 150 is thermally cured at a temperature below the thermal degradation temperature of the applied conductive ink 52. In still further embodiments, the adhesive 150 is both photocured and thermally cured at a temperature below the thermal degradation temperature of the applied conductive ink 52.

In an alternative embodiment of the method of FIG. 20, the step of curing the adhesive 150 as described in Step 510, and particularly photocuring the adhesive 150 as in Step 510, is initiated prior to positioning the terminal assembly 160 onto the adhesive 150 opposite the conductive ink 52 as in Step 508.

In Step 512, the wire harness 14 is coupled to the terminal assembly 160. In particular, such as in FIG. 8, the wires of the wire harness 14 are electrically coupled to the second portion 174 of the flange portion 170.

Figure 21:
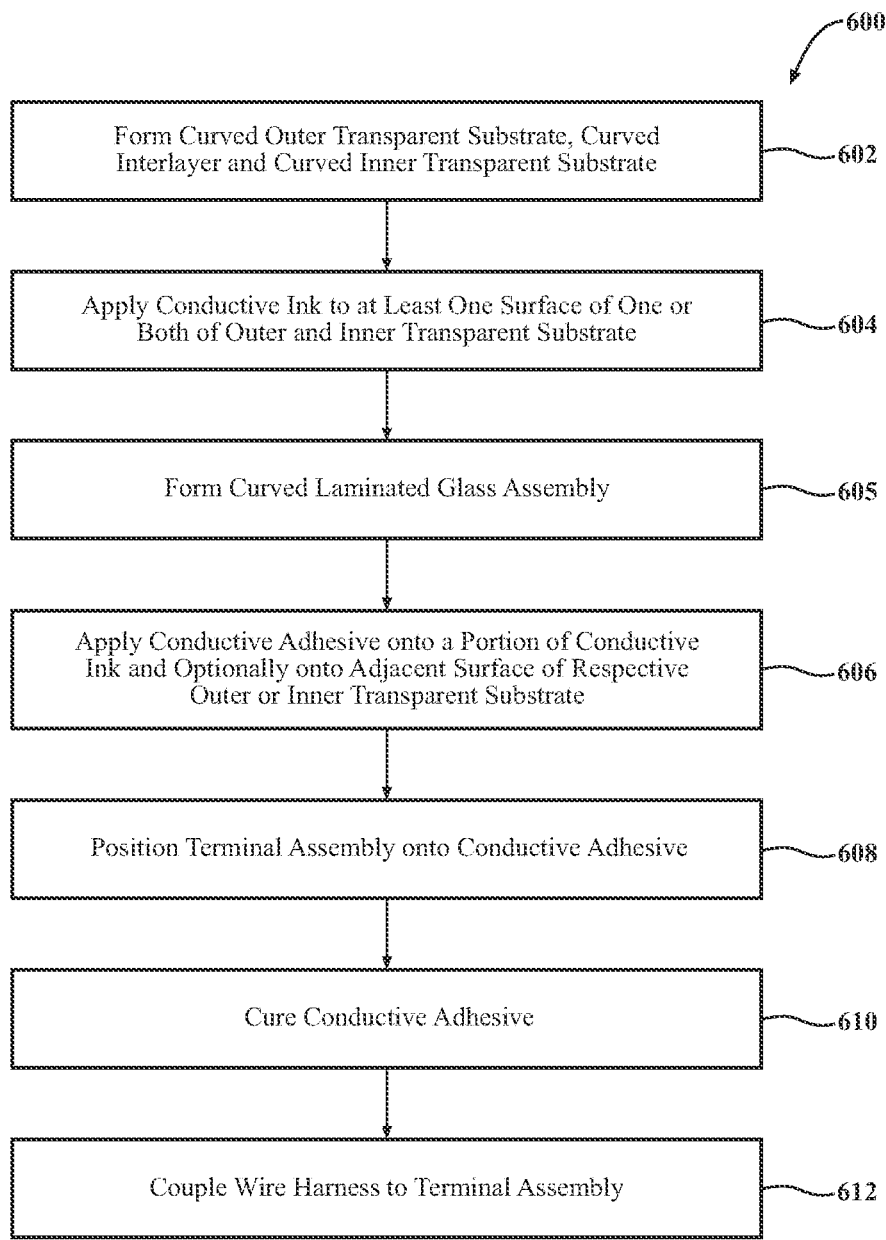
FIG. 21 is a flowchart illustrating a method of manufacturing a glass assembly having a solderless electrical connector in accordance with another related exemplary embodiment.

Referring next to FIG. 21, one exemplary embodiment of a method 600 for forming the glass assembly 10 with the solderless electrical connector 12 on a laminated window assembly 90 is provided. For ease of description, the flowchart of FIG. 21 is described with respect to the embodiment of FIG. 11, in which the solderless electrical connector 12 is disposed on the outwardly facing surface 106A of the inner transparent substrate 106. However, the same procedure can be utilized in which the solderless electrical connector 12 is disposed on the inwardly facing surface 100B of the outer transparent substrate 100 in accordance with the flowchart of FIG. 21, with the slight differences in the procedure described in Step 604 below.

Referring first to Step 602, and as best shown in FIG. 9, the outer transparent substrate 100, interlayer 102, and inner transparent substrate 106 are formed, with the outer transparent sheet 100 and interlayer 102 being formed with the scalloped edge 100C, 102C as described above. While not shown in FIG. 9, the outer transparent substrate 100, interlayer 102, and inner transparent substrate 106 are formed as a curved outer transparent substrate 100, a curved interlayer 102, and an inner transparent substrate 106 as a part of these formation steps.

Next, in Step 604, the conductive ink 104 is applied to at least one surface 100B, 106A of one or both of the outer and inner transparent substrate 100, 106 (shown in FIG. 11 as being applied to the outwardly facing surface 106A of the inner transparent substrate 106). The methods for applying the conductive ink 104 are the same as those discussed above and not repeated herein for brevity. Optionally, as a part of Step 604, the applied conductive ink 104 is photocured and/or thermally cured to form a cured conductive ink, or sintered to form a sintered conductive ink 104, or is otherwise dried, as described above.

Next, in Step 605, the laminated window assembly 90 is formed, in which the interlayer 102 is disposed between the outer and inner transparent substrates 100, 106 and with the conductive ink 104 disposed between the interlayer 102 and the inner transparent sheet 106 as shown in FIG. 10. As a part of Step 605, heat and pressure are applied sufficient to form a laminate in which the interlayer 102 is bonded to both the outer transparent substrate 100 and to the conductive ink 104 but insufficient to degrade the conductive ink 104. Also, as a part of Step 605, the scalloped edge regions 100C, 102C are aligned to form a coextensive scalloped edge 107 and a portion of the outwardly facing surface 106A of the inner transparent substrate 106 and a portion of the conductive ink 104 remain uncovered.

Next, in Step 606, the adhesive 150 is applied onto a portion of the conductive ink 104 and optionally onto the outwardly facing surface 106A of the inner transparent substrate 106 adjacent to the conductive ink 104 (i.e., onto a portion of the inwardly facing surface 106A adjacent to the edge of the conductive ink 104).

In Step 608, the terminal assembly 160 is positioned onto the adhesive 150 opposite the conductive ink 104. In particular, the lower surface 164 of the base plate portion 162 is disposed onto, and is in contact with, the upper surface of the adhesive 150. More in particular, the lower surface 164 of the base plate portion 162 is pressed into the upper surface of the adhesive 150.

In embodiments where the base plate portion 162 is formed from a non-conductive material, the second portion 174 of the flange portion 170 is also brought into contact with the upper surface of the adhesive 150 during Step 608. In still further alternative embodiments, where the base plate portion 162 is formed from an electrically conductive material, the second portion 174 of the flange portion 170 is also brought into contact with the upper surface of the adhesive 150 during Step 608.

In embodiments where the base plate portion 162 and flange portion 170 are separate components, Step 608 may also include the substep where the base plate portion 162 and flange portion 170 are affixed to each other to form an integral structure prior to, or after, being disposed onto the adhesive 150.

Next, in Step 610, the adhesive 150 is cured to form the solderless electrical connector 12 by the method described above and not repeated herein for brevity.

In Step 612, the wire harness 14 is coupled to the terminal assembly 160. In particular, such as in FIG. 11, the wires of the wire harness 14 are electrically coupled to the second portion 174 of the flange portion 170.

Figure 22:
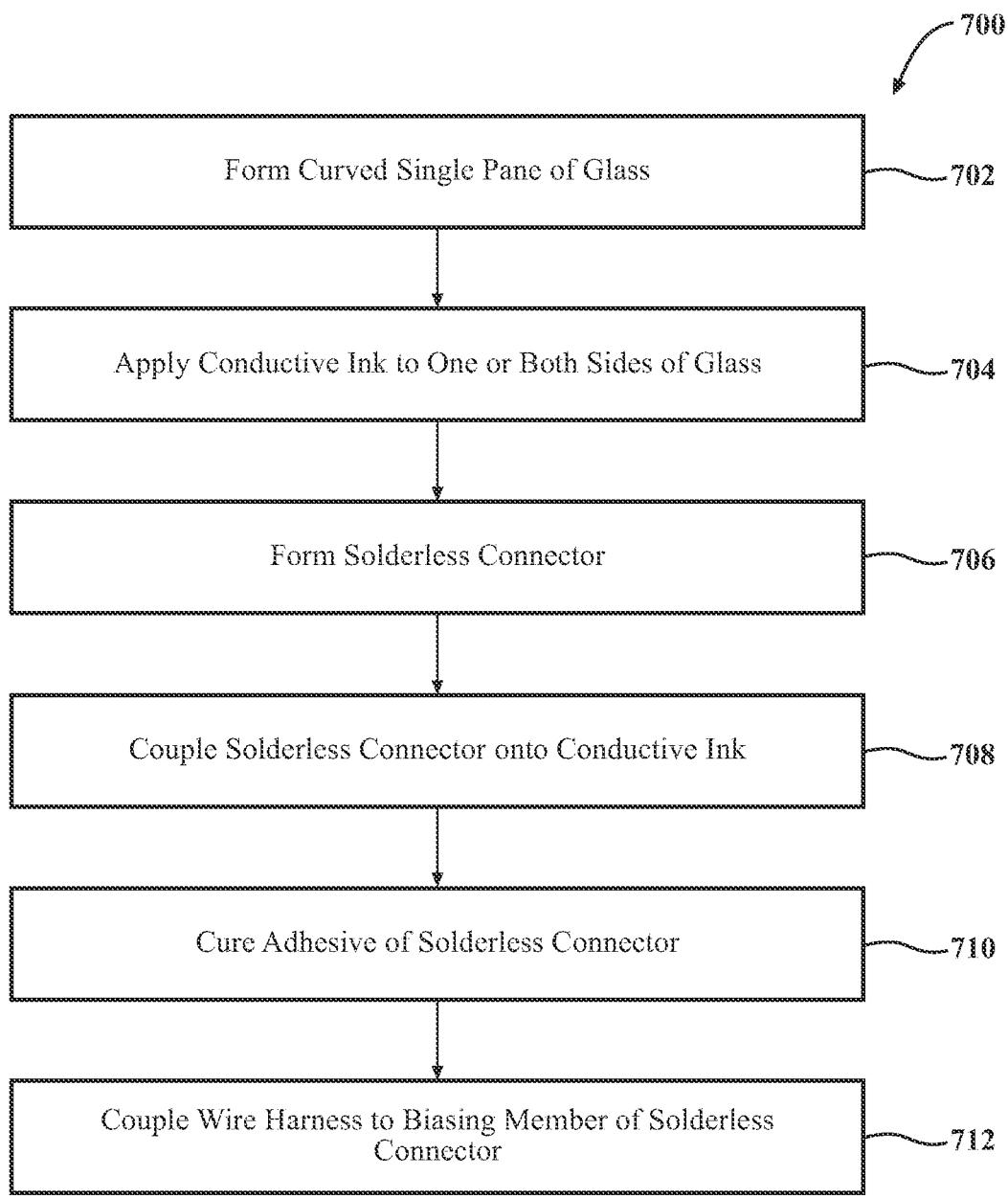
FIG. 22 is a flowchart illustrating a method of manufacturing a glass assembly having a solderless electrical connector in accordance with yet another related exemplary embodiment.

Referring next to FIG. 22, one exemplary embodiment of a method 700 for forming the glass assembly 10 with the solderless electrical connector 300 on a single pane of glass 50 is provided. For ease of description, the flowchart is described with respect to the embodiment of FIG. 15, in which the solderless electrical connector 300 is disposed on the inwardly facing surface 50B of the single pane of glass 50. However, the same procedure can be utilized in which the solderless electrical connector 300 is disposed on the outwardly facing surface 50A of the single pane of glass 50 in accordance with the flowchart of FIG. 22, with the slight differences in the procedure described in Step 704 below.

Referring first to Step 702, the single pane of glass 50 is formed as a curved piece of glass having the inwardly facing surface 50B and outwardly facing surface 50A, as described above.

Next, in Step 704, the conductive ink 52 is applied to one or both of the inwardly facing surface 50B and outwardly facing surface 50A (shown in FIG. 8 as being applied to the inwardly facing surface 50B as in FIG. 2) by the same procedure described above in Step 504 of FIG. 17 and not repeated herein. The methods for applying the conductive ink 104 are the same as those discussed above and not repeated herein for brevity. Optionally, as a part of Step 704, the applied conductive ink 52 is photocured and/or thermally cured to form a cured conductive ink, or sintered to form a sintered conductive ink 52, or is otherwise dried, as described above.

In Step 706, the solderless electrical connector 300 according to an alternative embodiment is formed or otherwise provided.

In certain embodiments in which the solderless connector is formed, as noted above, the biasing member/leaf spring(s) 320 may be molded within, or otherwise coupled to, the molded insulating cover 302 such that central region 326 extends through and is affixed to the insulating cover 302 with the first end 322 extending outwardly away from the inner surface 306 and with the second end 324 extending outwardly away from the outer surface 308. The adhesive 350 is then applied to the inner surface 306 of the insulating cover 302 adjacent to the intersection 309 of the inner surface 306 and edge surface 308. In addition, in certain embodiments, the adhesive 350 may also be applied to the inner surface 306 in areas not associated with the second end 324 of the biasing member/leaf spring(s) 320.

In exemplary embodiments such as in FIGS. 12-16, the adhesive 350 in the form a tape that is adhered to the inner surface 306 and may be non-conductive or conductive.

Next, in Step 708, the solderless connector 300 is coupled onto the conductive ink 52. In particular, the first end 322 of each of the biasing members 320 is positioned into electrical contact with the conductive ink 52 and is elastically compressed between the molded insulating cover 302 and the conductive ink 52. The adhesive 350 is pressed onto the transparent substrate 18, and in particular onto the outwardly facing surface 50B of the single pane of glass 50 or onto the outer surface 53 of the conductive ink 52 to adhere the insulative cover 302 to the transparent substrate 18/single pane of glass 50 directly, or to the transparent substrate 18/single pane of glass 50 indirectly through the conductive ink 52 such that the first end 322 of the biasing member/leaf spring(s) 320 is also sealingly disposed between the adhesive 350, the inner surface 306 of the insulative cover 302, and the top surface of the conductive ink 52. In addition, the second end 324 of the biasing member/leaf spring(s) 320 extends outwardly from the outer surface 308 of the insulative cover 302 in a direction away from the transparent substrate 18/single pane of glass 50 and conductive ink 52.

Next, in Step 710, the adhesive 350 is cured to form the solderless electrical connector 12. In step 710, curing of the adhesive 350 is initiated by applying a stimulus. In particular, the curing the adhesive 350 is at a temperature below the thermal degradation temperature of the conductive ink 52. This is desirable so as to prevent the loss of electrical conductivity along a portion or all of the conductive feature 16 resulting from the degradation of the conductive ink 52 if exposed to temperatures above its thermal degradation temperature.

In certain embodiments, the adhesive 350 is photocured/photoinitiated at a temperature below the thermal degradation temperature of the conductive ink 52. For example, the adhesive 350 is photocured/photoinitiated by exposing the adhesive momentarily to an ultraviolet light source. In such an embodiment, the curing process may be self-sustaining once externally initiated, yet slow enough to provide a minimum amount of time (e.g. greater than about 20 seconds) so that a user can perform the remaining steps. In one example, the self-sustaining curing may be facilitated by providing one or more of a catalyst and an initiator with a plurality of microcapsules that may release the catalyst and/or initiator upon exposure to the light source such as an ultraviolet lamp.

In certain other embodiments, the adhesive 350 is thermally cured at a temperature below the thermal degradation temperature of the conductive ink 52. In these embodiments, the applied adhesive 350 may be cured in an oven or by other thermal means or ambiently cured, with the provision that this curing is done at temperatures below the thermal degradation temperature of the conductive ink 52, 104 as noted above. In still further embodiments, the adhesive 350 is both photocured and thermally cured at a temperature below the thermal degradation temperature of the conductive ink 52 by the methods described above.

If the adhesive 350 is a tape adhesive 350 that is light activated, the carrier material is removed from the adhesive 350 and light is applied to the tape adhesive 350 prior to application of the tape adhesive 350 onto the transparent substrate 18, and in particular onto the outwardly facing surface 50B of the single pane of glass 50 or onto the outer surface 53 of the conductive ink 52 to adhere the insulative cover 302 to the transparent substrate 18/single pane of glass 50 directly, or to transparent substrate 18/single pane of glass 50 as in Step 708.

In Step 712, the wire harness 14 is coupled to second end 324 of each of the biasing members 320. In particular, such as in FIG. 15, the wires of the wire harness 14 are electrically coupled to the second end 324 of each of the biasing members 320 through the openings in the biasing members 320.

Figure 23:
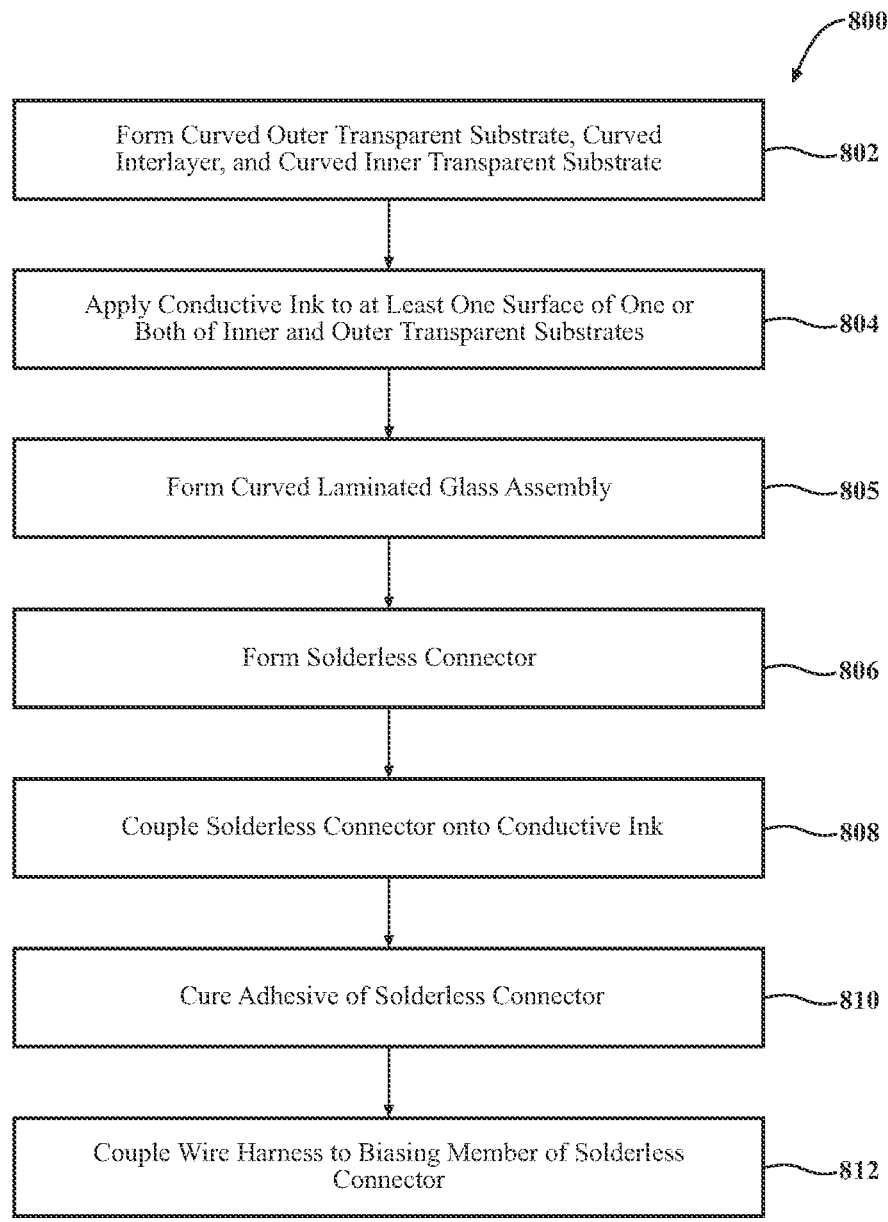
FIG. 23 is a flowchart illustrating a method of manufacturing a glass assembly having a solderless electrical connector in accordance with still another related exemplary embodiment.

Referring next to FIG. 23 one exemplary embodiment of a method 800 for forming the glass assembly 10 with the solderless electrical connector 300 on a laminated window assembly 90 is provided. For ease of description, the flowchart is described with respect to the embodiment of FIG. 16, in which the solderless electrical connector 300 is disposed on the outwardly facing surface 106A of the inner transparent substrate 106. However, the same procedure can be utilized in which the solderless electrical connector 300 is disposed on the inwardly facing surface 100B of the outer transparent substrate 100 in accordance with the flowchart, with the slight differences in the procedure described in Step 804 below.

Referring first to Step 802, and as best shown in FIG. 9, the outer transparent substrate 100, interlayer 102, and inner transparent substrate 106 are formed as described above and not repeated herein.

Next, in Step 804, the conductive ink 104 is applied to at least one surface 100B, 106A of one or both of the outer and inner transparent substrate 100, 106 (shown in FIG. 16 as being applied to the outwardly facing surface 106A of the inner transparent substrate 106).

The methods for applying the conductive ink 104 are the same as those described above in Step 504 of FIG. 17 with respect to the application of the conductive ink 52 and not repeated herein for brevity. Optionally, as a part of Step 804, the applied conductive ink 52 is photocured and/or thermally cured to form a cured conductive ink, or sintered to form a sintered conductive ink 52, or is otherwise dried, as described above.

Next, in Step 805, the laminated window assembly 90 is formed, in which the interlayer 102 is disposed between the outer and inner transparent substrates 100, 106 and with the conductive ink 104 disposed between the interlayer 102 and the inner transparent sheet 106 as shown in FIG. 16 by the same method described above and not repeated herein for brevity.

In Step 806, the solderless electrical connector 300 according to an alternative embodiment is formed or otherwise provided in accordance with the method described above and not repeated herein for brevity.

Next, in Step 808, the solderless connector 300 is coupled onto the conductive ink 104. In particular, the first end 322 of each of the biasing members 320 is positioned into electrical contact with the conductive ink 104 and is elastically compressed between the molded insulating cover 302 and the conductive ink 104. The adhesive 350 is pressed onto the transparent substrate 18, and in particular onto the outwardly facing surface 106B of inner transparent sheet 106 or onto the outer surface 105 of the conductive ink 104 to adhere the insulative cover 302 to the transparent substrate 18/inner transparent sheet 106 directly, or to transparent substrate 18/inner transparent sheet 106 indirectly through the conductive ink 104 such that the first end 322 of the biasing member/leaf spring(s) 320 is also sealingly disposed between the adhesive 350, the inner surface 306 of the insulative cover 302, and the top surface 105 of the conductive ink 104. In addition, the second end 324 of the biasing member/leaf spring(s) 320 extends outwardly from the outer surface 308 of the insulative cover 302 in a direction away from the transparent substrate 18/inner transparent sheet 106 and conductive ink 104.

Next, in Step 810, the adhesive 350 is cured to form the solderless electrical connector 300 in substantially the same manner described above in Step 710 of FIG. 20 and not repeated herein for brevity.

In Step 812, the wire harness 14 is coupled to second end 324 of each of the biasing member 320. In particular, such as in FIG. 16, the wires of the wire harness 14 are electrically coupled to the second end 324 of each of the biasing members 320 through the openings in the biasing members 320.

Several embodiments have been described in the foregoing description. However, the embodiments described herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

Various additional alterations and changes beyond those already mentioned herein can be made to the above-described embodiments. This disclosure is presented for illustrative purposes and should not be interpreted as an exhaustive description of all embodiments or to limit the scope of the claims to the specific elements illustrated or described in connection with these embodiments. For example, and without limitation, any individual element(s) of the described embodiments may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Any reference to claim elements in the singular, for example, using the articles "a," "an," "the" or "said," is not to be construed as limiting the element to the singular. It will be further appreciated that the terms "include," "includes," and "including" have the same meaning as the terms "comprise," "comprises," and "comprising."

What is claimed is:

1. A method of manufacturing a window assembly having a solderless electrical connector, said method comprising:
    forming a transparent substrate that is curved;
    digitally-applying a conductive ink having a thermal degradation temperature without a mask onto a surface of the curved transparent substrate to form an applied conductive ink on the surface of the curved transparent substrate;
    providing a molded insulating cover and a biasing member coupled to the molded insulating cover, with the biasing member having a first end and an opposing second end, and
    applying an adhesive onto the surface of the curved transparent substrate adjacent to the applied conductive ink;
    coupling the molded cover to the adhesive with the first end of the biasing member being in electrical communication with the applied conductive ink and with the biasing member being elastically compressed between the molded insulating cover and the applied conductive ink; and curing the adhesive at a temperature below the thermal degradation temperature of the applied conductive ink to form the solderless electrical connector in electrical contact with the applied conductive ink.

2. The method of claim 1, further comprising coupling an electrical connection component to the second end of the biasing member with the electrical connection component being in electrical communication with the applied conductive ink through the biasing member.

3. The method of claim 1, wherein said step of applying a conductive ink onto the surface of the transparent substrate further comprises photocuring the applied conductive ink to form a cured conductive ink on the surface of the transparent substrate.

4. The method of claim 1, wherein said step of digitally-applying a conductive ink onto a surface of the curved transparent substrate without a mask comprises digitally-applying the conductive ink at a resolution of 400 dots per inch or greater without a mask onto a surface of the curved transparent substrate.

5. The method of claim 1, wherein the applied conductive ink has a line width of from 10 micrometers to 1 millimeter on the surface of the curved substrate.

6. The method of claim 1, wherein the adhesive comprises an adhesive tape, and wherein the adhesive is cured by applying pressure to the adhesive tape applied onto the surface of the curved transparent substrate at a temperature below the thermal degradation temperature of the conductive ink to form the solderless electrical connector.

7. The method of claim 1, wherein the transparent substrate comprises a first transparent substrate having an inner surface and an opposing outer surface, a second transparent substrate having an inner surface and an opposing outer surface; and a polymeric interlayer disposed and contacting the inner surface of each of the first and second transparent substrate, and
wherein said step of applying a conductive ink onto a surface of the curved transparent substrate to form a conductive ink on the surface comprises applying a conductive ink onto one or both of the inner and opposing outer surface of the first transparent substrate to form an applied conductive ink on one or both of the inner and opposing outer surface of the first transparent substrate.

8. The method of claim 7, further comprising:
coupling a conductive foil to the conductive ink with a portion of the conductive foil extending onto the outer surface of the first transparent substrate; and
coupling an electrical connection component to the solderless electrical connector with the electrical connection component being in electrical communication with the applied conductive ink through the conductive foil.

9. The method of claim 3, wherein the conductive ink comprises conductive particles and an organic monomer.

10. The method of claim 9, wherein the conductive ink includes a photoinitiator that initiates curing of the conductive ink in response to exposure to UV light.

11. The method of claim 1, wherein said step of curing the adhesive comprises heating the adhesive to a temperature at or above a thermal curing temperature of the adhesive but below the thermal degradation temperature of the applied conductive ink.

12. The method of claim 1, wherein said step of curing the adhesive comprises photocuring the adhesive at a temperature below the thermal degradation temperature of the applied conductive ink.

13. The method of claim 1, wherein a green strength of the adhesive is sufficient to maintain the molded insulating cover against the surface of the transparent substrate with the first end of the biasing member elastically compressed between the molded insulating cover and the applied conductive ink without external fixturing while the adhesive cures.

* * * * *